(12) United States Patent
Shellef

(10) Patent No.: US 11,578,732 B2
(45) Date of Patent: Feb. 14, 2023

(54) CONTROLLABLE PITOT DEVICE AND METHOD

(71) Applicant: ETTEM ENGINEERING S.A. LTD., Acco (IL)

(72) Inventor: Rammy A. Shellef, Tel Aviv (IL)

(73) Assignee: ETTEM ENGINEERING S.A. LTD., Acco (IL)

(*) Notice: Subject to any disclaimer, the term of this patent is extended or adjusted under 35 U.S.C. 154(b) by 122 days.

(21) Appl. No.: 16/984,113

(22) Filed: Aug. 3, 2020

(65) Prior Publication Data
US 2021/0040951 A1    Feb. 11, 2021

(30) Foreign Application Priority Data

Aug. 6, 2019    (IL) .......................................... 268530

(51) Int. Cl.
  *F04D 1/12*   (2006.01)
  *F04D 29/46*  (2006.01)
  *G01F 1/46*   (2006.01)

(52) U.S. Cl.
  CPC ............ *F04D 29/46* (2013.01); *F04D 1/12* (2013.01); *G01F 1/46* (2013.01)

(58) Field of Classification Search
  CPC . F04D 1/12; F04D 29/46; F04D 29/48; F04D 29/483; F04D 29/486; G01F 1/46
  See application file for complete search history.

(56) References Cited

U.S. PATENT DOCUMENTS

| 2,187,656 A | 1/1940 | Nikolaus et al. |
| 2,795,194 A * | 6/1957 | Neubaurer ................ F04D 1/12 |
| | | 415/88 |
| 4,280,791 A | 7/1981 | Gawne |

FOREIGN PATENT DOCUMENTS

WO    WO-2016202723 A1 * 12/2016

OTHER PUBLICATIONS

Extended European Search Report (EESR) dated Dec. 2, 2020, issued in counterpart European Application No. 20183919.8.

* cited by examiner

*Primary Examiner* — David E Sosnowski
*Assistant Examiner* — Jason G Davis
(74) *Attorney, Agent, or Firm* — Holtz, Holtz & Volek PC

(57) ABSTRACT

A controllable Pitot device uses a Pitot nozzle supported by a Pitot nozzle holder for pumping fluid flowing in a first direction or in a second direction flowing opposite the first direction. The Pitot nozzle has one ingestion inlet pivotable to ingest fluid from either direction. Ingested fluid impinges on an obstacle interior to the Pitot nozzle which is disposed opposite the ingestion inlet to create a zone of fluid at stagnation pressure. Stagnation pressure pumps fluid via the interior of the Pitot nozzle through one of two openings for discharging pumped fluid out of a discharge outlet supported by the nozzle holder, to the exterior of the Pitot device. The nozzle holder can be a support structure or an embedded support operative with a rotating fluid machine.

16 Claims, 9 Drawing Sheets

CONTROLLABLE PITOT DEVICE AND METHOD

TECHNICAL FIELD

Embodiments of the present invention relate in general to the field of Pitot pumps for pumping fluids, and in particular, to a controllable Pitot device which, amongst others, is adjustable to operate with a fluid flowing either in a first direction or with a fluid flowing in a second direction which flows opposite the first direction.

BACKGROUND ART

Description of Related Art

To pump fluid out of a flow of fluid flowing in one direction or in a direction opposite the one direction, use may be made of two Pitot pumps, thus one pump for each one direction of flow, as disclosed by Gordon S. Gawne in U.S. Pat. No. 4,280,791, referred to as Gawne hereinbelow.

However, it may be advantageous to provide one Pitot pump for pumping fluid out of a flow of fluid flowing in a first direction or in a second direction opposite the first direction of flow of the fluid.

SUMMARY OF INVENTION

The embodiments of the invention include a method and a device configured for pumping fluid out of a flow of fluid by use of a controllable Pitot device. A Pitot nozzle is configured to create a zone of fluid at stagnation pressure, thus at a higher pressure, created when the flow impinges on an obstacle, to pump fluid out of a flow of fluid. A Pitot nozzle holder is provided to support the Pitot nozzle therein in adjustable pivotal disposition.

The method and the device for implementing a controllable Pitot device may comprise a Pitot nozzle configured to pump fluid out of a flow of fluid. The controllable Pitot device may have a nozzle holder 40 which is configured to support the Pitot nozzle 30 in pivotable adjustment for orientation in angular dispositions. The angular dispositions are relative to a direction of flow of the fluid. The angular dispositions may include for example, rotation in a first angular disposition, to pump fluid flowing in a first direction of flow. Likewise, the Pitot nozzle may be rotated in a second angular disposition, to pump fluid flowing in a second direction of flow, which flows in a direction opposite the first direction of flow.

The Pitot nozzle may have a fluid ingestion inlet which is immersed in a flow of fluid flowing within the walls of a duct, like in a pipeline for example. The Pitot nozzle may pump fluid out of a flow of fluid flowing within the walls of the duct. The fluid may flow in a first direction of flow, and for pumping, the Pitot nozzle may be pivotally adjusted in a first angular disposition. In the same manner, still for pumping, the fluid may flow in a second direction of flow, which flows opposite the first direction of flow, wherefore the Pitot nozzle may be pivotally adjusted in a second angular disposition which is diametrically opposite the first angular disposition.

There is also described a method for implementing a controllable Pitot device comprising a Pitot nozzle having an immersed fluid ingestion inlet for pumping ingested fluid out of a fluid flowing in a seal chamber of a rotating fluid machine. There is provided a nozzle holder for supporting the Pitot nozzle therein, in controlled pivotable orientation, by rotation thereof in angular disposition, relative to the direction of flow of the fluid. Pumped fluid may be discharged to an exterior of the rotating fluid machine via a fluid discharge opening which is supported by the nozzle holder. The Pitot nozzle may be pivoted into a first angular disposition for pumping fluid out of a flow of fluid flowing in a clockwise direction. Likewise, pivoting the Pitot nozzle into a second angular disposition, which is diametrically opposite the first angular disposition, for pumping fluid out of a flow of fluid flowing in counterclockwise direction. With a rotating fluid machine, a seal plate or endplate closing the seal chamber may be configured as a nozzle holder.

It is noted that the Pitot nozzle may pump fluid out of a seal chamber of a rotating fluid machine which rotates fluid in clockwise or in counterclockwise direction. Therefore, the Pitot nozzle is pivotable in a clockwise direction and in a counterclockwise direction. Furthermore, the nozzle holder supports at least one fluid discharge opening, for discharging fluid ingested by the Pitot nozzle, to an exterior of the controllable Pitot device. It may be said that ingested fluid is discharged to the exterior of the nozzle holder, or to the exterior of the rotating fluid machine, or to the exterior of the endplate, or to exterior of the seal chamber, via a fluid discharge opening.

Technical Problem

Pitot pumps are usually operative with one specific direction of flow of fluid. For example, with a rotating fluid machine, fluid may flow either in a clockwise direction or in a counterclockwise direction. Similarly, in a pipe or duct, fluid may flow in one direction along the duct or in a thereto opposite direction of flow. To pump fluid out of a flow of fluid flowing in either one of both directions, Gawne recites two Pitot-like tubes, wherein each one Pitot-like tube has a fluid flow path for one direction of flow of the fluid. Although not shown by Gawne, a conduit for the discharge of fluid has to be coupled to the outlet port of each Pitot-like tube. Hence two conduits are needed, one conduit for each one Pitot-like tube, to receive the fluid discharged for each one direction of flow of the fluid. It is understood that when one Pitot-like tube is operative, the other Pitot-like tube has to be closed or blocked. This necessitates to couple the two Pitot-like tubes to a 3-way selector valve, i.e. a valve with three ports: one port for receiving fluid from each one of the two Pitot-like tubes, and a third port to discharge the pumped fluid out of the 3-way selector valve.

It would therefore be advantageous to provide a device and a method for implementing a controllable Pitot device, where control refers at least to operation with a flow of fluid flowing in one direction or with a flow of fluid flowing in a thereto opposite direction of flow. Furthermore, the controllable Pitot device may have but one fluid ingestion inlet and one fluid discharge outlet, compatible with both directions of flow of the fluid, whereby the use of a 3-way selector valve becomes superfluous.

Solution to Problem

There is provided a controllable Pitot device operative with a bidirectional flow of fluid, which means operative with a fluid flowing in one direction as well as with a fluid flowing in a direction opposite the one direction, flowing either in a duct or in a rotating fluid machine. The controllable Pitot device may have a Pitot nozzle which forms a bidirectional Pitot pump by being configured with a fluid ingestion inlet and a fluid discharge outlet, and may allow in situ adaptation, from the exterior thereof, to one of both directions of fluid flow. The controllable Pitot device is a mechanical device having a pivotable Pitot nozzle, which may be turned or rotated to orient the fluid ingestion inlet to face the incoming flow of fluid. Then, advantage is taken of the Bernoulli principle and derived Pitot effect to pump ingested fluid for discharge out and to the exterior of the controllable Pitot device.

The Bernoulli principle states that in view of the conservation of energy, in a constant flow of ideal fluid, ignoring gravity, the absolute total pressure is constant, or $$P_{total}=\text{Constant}=P_{static}+P_{dynamic}=P_{static}+\tfrac{1}{2}\rho V^2 \quad \text{(equ. 1)}$$

where $P_{total}$ is the absolute total stagnation pressure, $P_{static}$ is the absolute static ambient pressure, $P_{dynamic}$ is the dynamic pressure $\tfrac{1}{2}\rho V^2$, $\rho$ is the density of the fluid, and V is the velocity of the fluid.

This means that when a flow of fluid is brought to standstill by impingement on and arrest by an obstacle, the static pressure of the stopped flow of fluid rises up to stagnation pressure, which becomes the absolute total stagnation pressure. Evidently, if $P_{dynamic}=0$, then $P_{static}=P_{total}$.

The controllable Pitot device is configured to be bidirectional: This means that the device operates when pivotally adjusted to a first angular position for ingestion of fluid flowing in one first direction, and when pivotally adjusted to a second angular position, for ingestion of fluid flowing in the direction opposite the one first direction.

However, the configuration selected for the controllable Pitot device provided an unexpected ability to controllably but reversibly deactivate the pumping function of the bidirectional Pitot nozzle, thereby stopping the pumping of fluid. In other words, the controllable Pitot device may also be pivotally adjusted even in situ, in a third angular disposition wherein the pumping of fluid is reversibly discontinued, i.e. reversibly stopped.

In addition, the flow rate of fluid ingestion, or of flow discharge out of the controllable Pitot device, may be controlled by appropriate pivotal rotational adjustment of the Pitot nozzle. Moreover, the controllable Pitot device may be operated manually in situ, or by remote control, and/or by motorized means.

Advantageous Effects of Invention

The controllable Pitot device may have at least one fluid ingestion inlet, at least one fluid discharge outlet, and is bidirectional, thus adjustable for operation with fluid flowing in a first direction of flow or with fluid flowing in a second direction of flow flowing in a direction opposite the first direction of flow. The controllable Pitot device is thus bidirectional.

The controllable Pitot device is controllably adjustable from the exterior thereof, thus from the exterior of the duct, or rotating fluid machine, or the equipment, to which it may be coupled, to:
 a) be pivotally adjusted to one out of the two mutually opposite directions of flow of fluid,
 b) reversibly deactivate the pumping of fluid,
 c) control the flow rate of fluid ingested or discharged out of the controllable Pitot device, and
 d) be controllably operable manually, by remote control, and/or by motorized means.

Furthermore, the radial orientation of the direction of discharge of the pumped fluid out of the controllable Pitot device may be controllably selected, or adjusted as desired, even after installation and even in situ.

Moreover, if the controllable Pitot device is mistakenly assembled to operate for the wrong direction of flow of fluid, the mistake may be easily corrected, even after installation and in situ. In industry, the stored stock of single-direction-of-flow Pitot pumps may be reduced by half since a bidirectional controllable Pitot device fits both two opposite directions of flow of fluid. This ensues since the controllable Pitot device is configured as a bidirectional pump, thus configured to pump fluid flowing in a first direction of flow and in a second direction of flow flowing in a direction opposite the first direction of flow, as well as, if desired, to pump fluid flowing in one direction of flow.

The controllable Pitot device is thus configured as a controllably adjustable and versatile product.

BRIEF DESCRIPTION OF DRAWINGS

In the drawings, like reference characters generally refer to the same parts throughout the different views. Also, the drawings are schematic and not to scale, emphasis instead generally being placed upon illustrating the principles of the invention. Various non-limiting embodiments of the present invention are described with reference to the following description of exemplary embodiments, in conjunction with the figures in which.

DESCRIPTION OF EMBODIMENTS

Described hereinbelow is a method for the implementation of embodiments of a product or a device operative as a controllable Pitot device 10 for pumping fluid out of a field of fluid flowing in a duct 60 or in a rotating fluid machine 20. Hereinbelow, a duct 60 refers to a casing wherein fluid flows in a rotating fluid machine 20, as well as to walls bounding fluid which flows in a pipe or other conduit of fluid. For a rotating fluid machine 20, such as a pump or a compressor for example, fluid may be pumped out of the seal chamber 76. The term duct 60 is not restricted to the shape of the conduit, either straight or arcuate, wherein the fluid flows.

Figure 1:
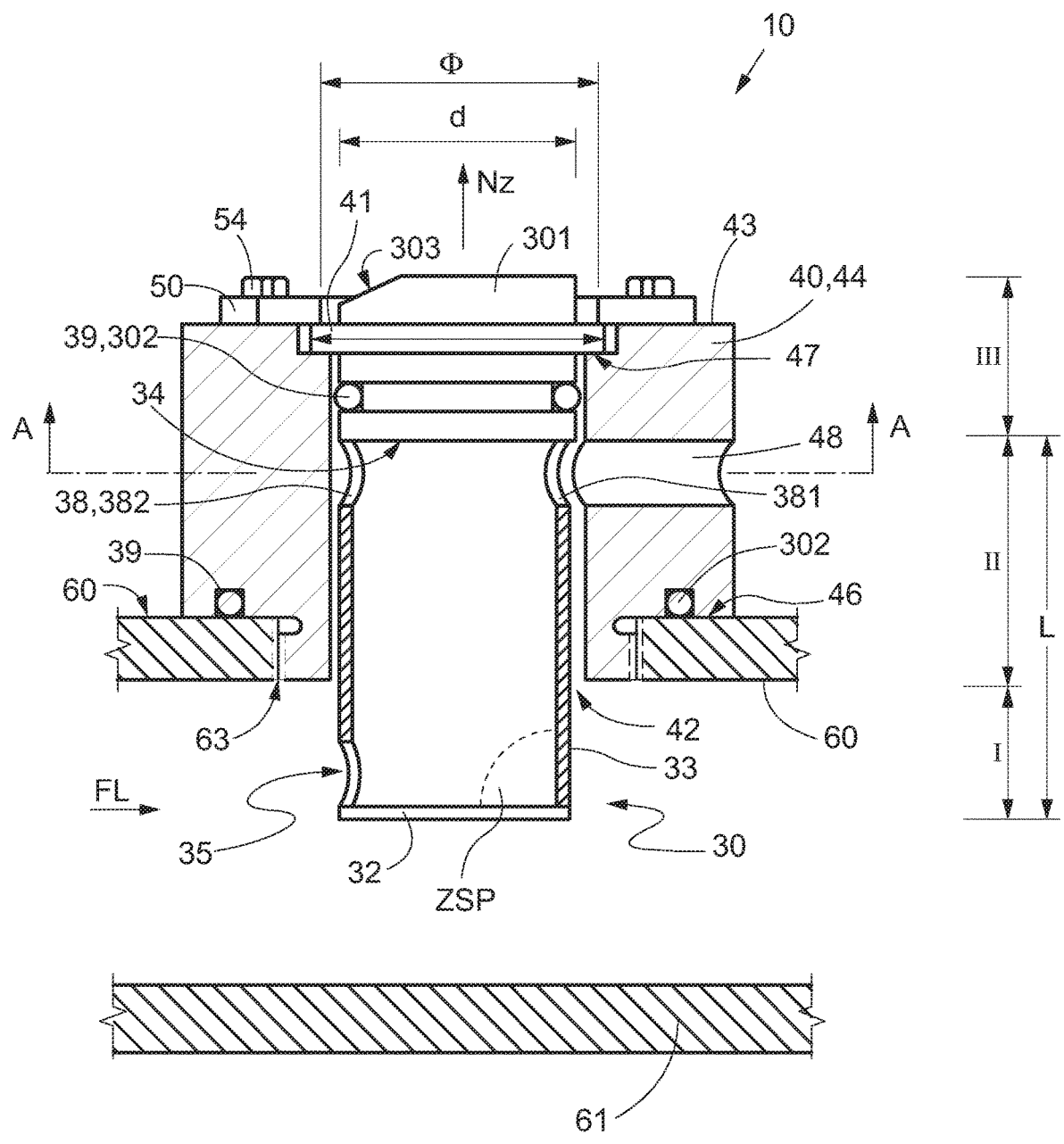
FIG. 1 is a schematic partial cross-section illustrating an exemplary embodiment of a controllable Pitot device adjusted for pumping fluid flowing in a first direction.
Figure 2:
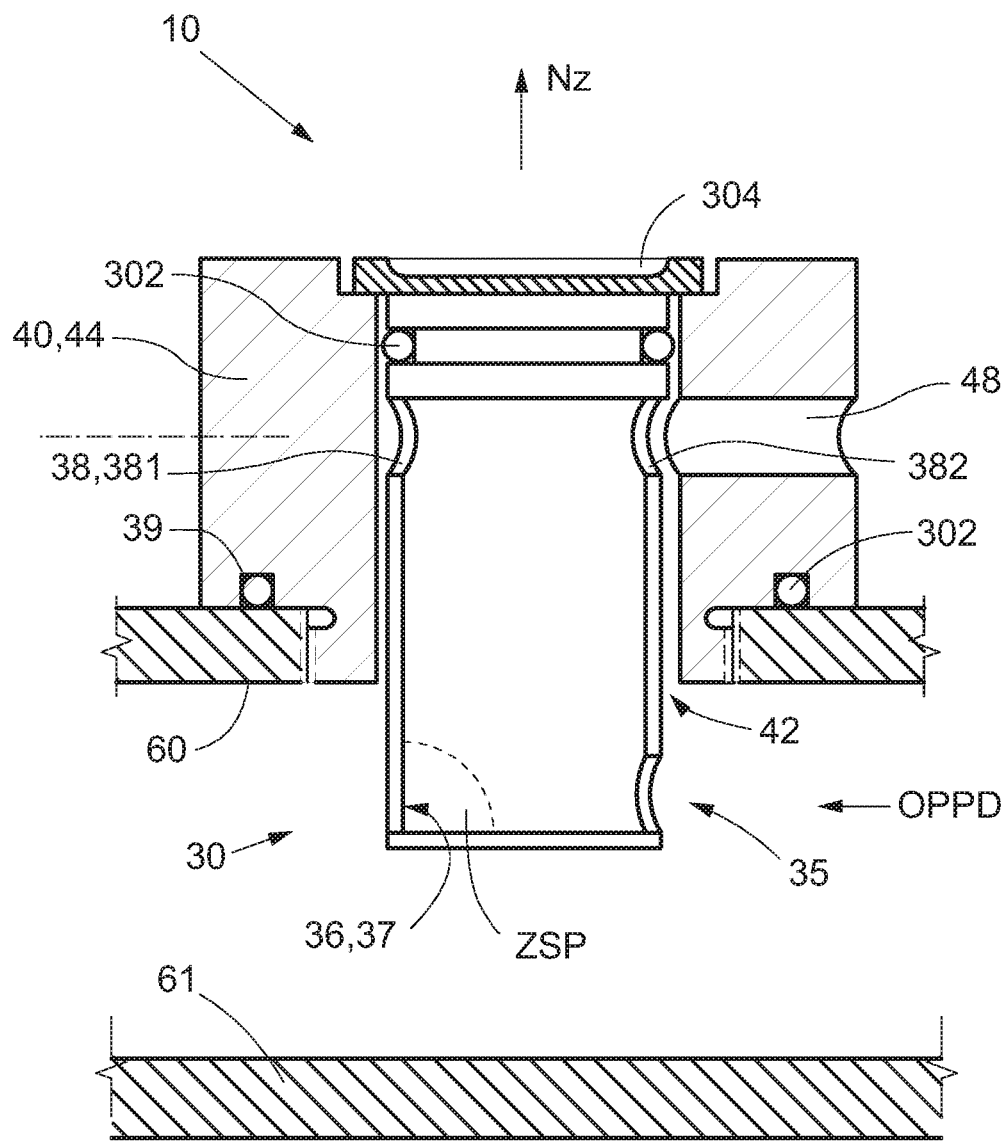
FIG. 2 is a schematic partial cross-section illustrating an exemplary embodiment of a controllable Pitot device adjusted for pumping fluid flowing in a second direction opposite the first direction.

FIG. 1 is a schematic partial cross-section illustrating an exemplary embodiment of a bidirectional controllable Pitot device 10 for pumping fluid which flows in a first direction of flow FL. FIG. 2 illustrates the same embodiment as shown in FIG. 1 but after angular pivotal adjustment of the Pitot nozzle 30 to a flow of fluid flowing in a second direction OPPD, opposite by 180° to the first direction of flow FL shown in FIG. 1. The description hereinbelow refers to fluid flowing in the first direction of flow FL shown in FIG. 1 which description is also valid in principle with FIG. 2 for fluid flowing in the second direction of flow OPPD flowing in a direction opposite the first direction of flow FL, say by 180°.

FIGS. 1 and 2 depict an exemplary controllable Pitot device 10 including a pivotally angularly adjustable Pitot Nozzle 30 operative in association with a Pitot nozzle holder 40, or nozzle holder 40 for short, which forms a support for the Pitot nozzle.

Pivotable Pitot Nozzle

The pivotable Pitot nozzle 30 has the general shape of a right cylinder aligned about a longitudinal axis Nz, and has a portion which forms a hollow Pitot nozzle interior 31, or interior 31. The Pitot nozzle 30 may be divided into three main mutually coupled and sequentially aligned stacked portions. These three portions may include a hollow first fluid intake portion I or immersed portion I, a second tubular portion II, and a third solid portion III. Both the first fluid intake portion I and the second tubular portion II form the hollowed out interior 31 for the passage of the ingested fluid therethrough and thereout, when pumping. The second tubular portion II and the third solid portion III extend in aligned sequence away from the first fluid intake portion I along the longitudinal axis Nz.

The bottom of the fluid intake portion I of the Pitot nozzle 30 may be closed by a circular nozzle bottom closure 32 which may preferably be disposed in a direction parallel the direction of flow of the fluid. The fluid ingestion inlet 35 may be opened adjacent the nozzle bottom closure 32 and have a generally rectangular shape, but different geometrical shapes, such as a circular shape for example, may also be practical. A nozzle wall 33 rises from the bottom closure 32 and may extend further away, out of portion I and along the longitudinal nozzle axis Nz, up to a nozzle top closure 34 of the tubular portion II. The nozzle wall 33, the nozzle bottom closure 32, and the top closure 34, delimit the interior 31 of the Pitot nozzle 30 and provide a passage for the ingested fluid.

The first fluid intake portion I includes a fluid ingestion inlet 35, a back-wall 36, an obstacle 37, and a portion of the hollowed out or tubular interior 31. The fluid ingestion inlet 35 which is an opening entered in the nozzle wall 33, may be disposed adjacent the nozzle bottom closure 32, to operate as a fluid entry aperture configured for the intake of incoming fluid. The fluid ingestion inlet 35 is disposed upstream and diametrically opposite the obstacle 37 formed by the back-wall 36 portion of the nozzle wall 33 on which the incoming fluid impinges. The tubular interior 31 extends along the longitudinal axis Nz further away from the fluid ingestion inlet 35 and into the second tubular portion II of the Pitot nozzle 30.

The second tubular portion II of the Pitot nozzle 30 forms most of the length of the nozzle interior 31 and includes fluid discharge exit openings 38.

The hollow interior 31 of the tubular portion II may include at least two coaxially aligned diametrically opposite open exit openings 38, referred to hereinbelow as aligned openings 38 for short, which are opened in the nozzle wall 33 perpendicular to the nozzle axis Nz. The exit openings 38 may include a first exit opening and a second exit opening, respectively 381 and 382, and may be disposed adjacent the nozzle top closure 34 which may terminate the tubular hollow interior 31. The exit openings 38 may thus be separated apart in diametrically opposed alignment perpendicular the axis Nz of the Pitot nozzle 30. A length L of the Pitot nozzle 30 may stretch from the nozzle bottom closure 32 up to the nozzle top closure 34. The length L may be adapted to the configuration and dimensions of the duct 60 or the machine out of which fluid is pumped.

The third solid portion III of the Pitot nozzle 30 which extends further away from the nozzle top closure 34 along the longitudinal axis Nz, may include at least one seal groove 39, a swivel plate 41, and a pointer 301.

At least one seal groove 39, which extends further away from the nozzle top closure 34 along the longitudinal axis Nz, may be cut in the Pitot nozzle 30 perpendicular the longitudinal axis Nz to receive therein a seal 302 such as an O-Ring™ for example. The seal 302 is configured to prevent leaks of fluid out of the here axially disposed support bore 42 and to the exterior EXT of the controllable Pitot device 10, as described hereinbelow with respect to the nozzle holder 40. The word exterior EXT is meant to indicate the exterior EXT of the controllable Pitot device 10, the exterior EXT of a duct 60, the exterior EXT of a nozzle holder 40, and the exterior EXT of a rotating fluid machine 20.

The swivel plate 41 may be disposed further away along the longitudinal nozzle axis Nz, from the at least one seal groove 39 in the Pitot nozzle 30, and may be accessible from the exterior EXT of the controllable Pitot device 10. Finally, an indicator or pointer 301 may be affixed to the swivel plate 41 to indicate a direction, such as the direction of orientation of the fluid ingestion inlet 35. The pointer 301 may thus indicate and allow detection of the angular disposition direction of the fluid ingestion inlet 35, by sight and/or by touch. The pointer 301, which may protrude out of the holder head 43 of the nozzle holder 40, along the axis Nz, is accessible from the exterior EXT of the controllable Pitot device 10, and permits pivoting or rotation of the Pitot nozzle 30 about the thereof longitudinal axis Nz. Hence, the pointer 301 is configured for ease of orientation of the fluid ingestion inlet 35 manually, by motorized means and by remote control. The pointer 301 may protrude as a ridge surfacing out and away from the swivel plate 41, or may be recessed therein as a diametric channel or recess 304 shown in FIG. 2, or as a portion of a diametrical channel, which is not shown. Hence, the angular disposition of the Pitot nozzle 30 may be adjusted by access to a portion thereof, such as the pointer 301 for example, which protrudes to the exterior EXT, out of the nozzle holder 40.

Nozzle Holder

The nozzle holder 40, which is operative in association with the Pitot nozzle 30 of the controllable Pitot device 10, is described with reference to FIGS. 1 and 2.

The nozzle holder 40 may be configured to hold and support the Pitot nozzle 30 therein in pivotal adjustable rotatable angular disposition. The nozzle holder 40 is a mechanical structure for holding, supporting and retaining the Pitot nozzle 30 in pivotal freedom of motion, and is operative for the disposition of the Pitot nozzle 30 relative to the direction of flow of fluid flowing in a conduit or duct of fluid 60.

Figure 20:
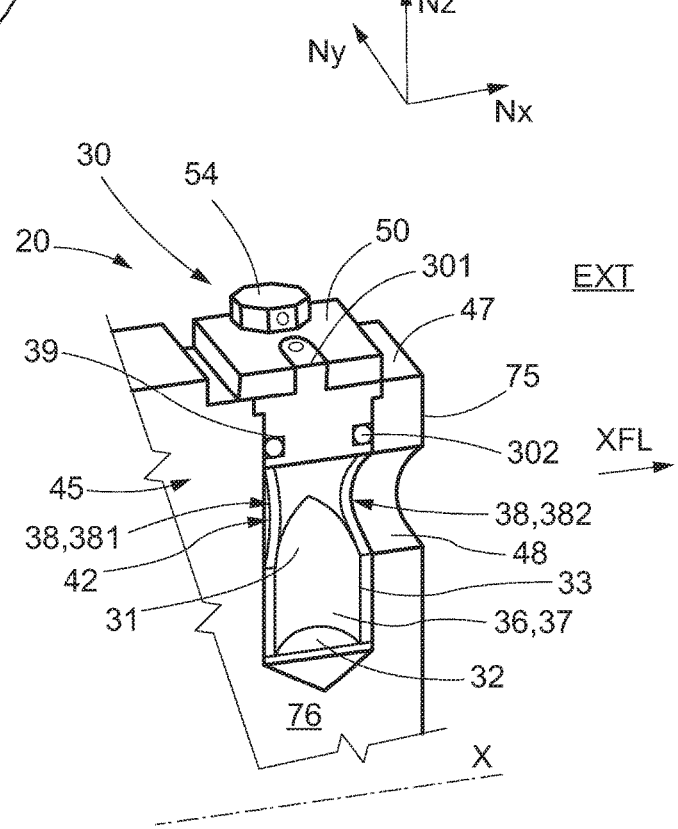

The nozzle holder 40 may be configured either as an independent machine part which forms a Pitot nozzle support structure 44, as shown in FIGS. 1 and 2, or in a configuration integral with and embedded into a portion of a duct wall 61 into which the nozzle holder 40 is formed as an embedded Pitot nozzle support 45. FIG. 20 illustrates an exemplary embodiment of a Pitot nozzle embedded support 45 shown as a generally cylindrical bore formed in the wall 61 of a duct 60. An embedded support 45 may be replaced by a support structure 44 when the former is not practical. The Pitot nozzle support structure 44 and the Pitot nozzle embedded support 45 are referred to hereinbelow for short as, respectively, support structure 44 and embedded support 45.

The support structure 44 may have a base 46 which may be conformed to be affixed to an exterior duct surface 65 of the duct 60 out of which fluid is pumped. A seal 302, such as an O-ring™ for example, may be disposed in a seal groove 39 cut in the support structure 44 as shown in FIG. 1. Alternatively, the seal groove 39 may be cut in the duct 60. In both cases, the seal 302 is disposed intermediate the duct 60 and the nozzle holder 40 to prevent leaks out of the duct 60 into which the Pitot nozzle 30 penetrates. Alternatively, other means well known in the art may prevent leaks out of the interface between the duct 60 and the nozzle holder 40. For example, a threaded screw coupling 62 configured to fasten the nozzle holder 40 to the duct 60 may be suitably treated to become sealed in appropriate orientation and prevent the passage of fluid therethrough.

The nozzle holder 40 may have a circular cross-sectional shape, or another desired or functionally advantageous cross-sectional geometrical shape. The nozzle holder 40 may have an axially disposed support bore 42 which is configured to receive, support, and retain the Pitot nozzle 30 coaxially therein in a pivotal degree of freedom of motion about the longitudinal axis Nz. Furthermore, the nozzle holder 40 in the form of a support structure 44 may be fixedly attached to the duct 60 by being integrally embedded in such a duct 60, or be coupled thereto by mechanical fastening means well known in the art. Examples of mechanical fastening means may include one or more of a threaded screw coupling 62, bolts, screws, strap bands, and shackles. A nozzle holder 40 configured as an integrally embedded structure 45 is described hereinbelow with reference to FIG. 20.

The nozzle holder 40 further has a holder head 43 wherein a possibly circular recessed arrest surface 47 may be provided in concentricity with the axially disposed support bore which passes throughout the nozzle holder from the holder head 43 to the base of the nozzle holder 46. The arrest surface 47 may support the swivel plate 41 of the Pitot nozzle 30 and prevent axial displacement thereof further into the flow of fluid. The swivel plate 41 may have a diameter D, smaller than a diameter Φ of the arrest surface 47 but exceeding the diameter d of the axially disposed support bore 42, and may be appropriately pivotally seated on the arrest recess 47. The at least one seal 302 mounted in the seal groove 39 in the Pitot nozzle 30 is the seal which prevents the escape of fluid along the axially disposed support bore 42 and to the exterior EXT of the controllable Pitot device 10.

In addition, the stationary nozzle holder 40 supports a to the nozzle axis Nz perpendicularly disposed radial fluid discharge outlet 48, accommodated to receive fluid exiting via one out of the two exit openings 38 when both the fluid discharge outlet 48 and one uncovered open exit opening 38 are disposed in mutual fluid communication. Typically, a pipe or a tube such as a conduit of fluid, or a closed-loop duct 91 shown in FIG. 23, may be coupled to the radial fluid discharge outlet 48 to channel fluid discharged thereout away and to the exterior EXT of the controllable Pitot device 10.

FIG. 2 depicts the controllable Pitot device 10 after pivotal adjustment thereof to a flow of fluid which flows in a second direction opposite by 180° to the first direction of flow FL shown in FIG. 1. The principle of operation of the controllable Pitot device 10 remains the same for both directions of flow of the fluid: ingested incoming fluid will penetrate through the ingestion inlet 35 and be pumped out, via the interior 31, through one out of the two exit openings 38, to the exterior EXT of the controllable Pitot device 10 via the unobstructed radially open fluid discharge outlet 48. As shown in both FIGS. 1 and 2, one out of the two exit openings 38 may be pivotally aligned in fluid communication with the unobstructed open stationary fluid discharge outlet 48 provided in the nozzle holder 40. Thereby, for operation in a field of flow flowing in the second direction OPPD, ingested fluid that is pumped via the relevant open exit opening 38 will be discharged through the unobstructed open stationary fluid discharge outlet 48 and thus be discharged to the exterior EXT of the controllable Pitot device 10.

As depicted in FIG. 2, to pump fluid flowing in an opposite direction of flow OPPD, the Pitot nozzle 30 is adjustably pivoted or turned by 180° about the longitudinal axis Nz relative to the angular disposition shown in FIG. 1. Thereby, the first exit opening 381 is blocked, or covered, by the nozzle holder 40 but ingested fluid may flow out of the open second exit opening 382 to the exterior EXT, via the unobstructed open fluid discharge outlet 48.

Before Operation

Before operation, the controllable Pitot device 10 has to be coupled to the duct 60 out of which fluid is to be pumped. If the duct of fluid 60 cannot provide, or cannot be configured as a practical embedded support 45, then a support structure 44 may be mounted on the duct. First, an aperture 63, shown in FIGS. 1 and 16, has to be opened in the duct 60 for the passage therethrough of at least the immersed portion I of the Pitot nozzle 30. Thereafter, the axially disposed support bore 42 of the support structure 44 is coaxially centered on the aperture 63, and the nozzle holder 40 is fixedly attached to the duct 60 in sealed coupling to prevent leaks of fluid. Mechanical coupling means and sealing techniques are well known in the art and do not have to be described. In turn, the Pitot nozzle 30 is introduced via the axially disposed support bore 42 until properly disposed for operation. This means that the swivel plate 41 is seated on the arrest recess 47. Evidently, the Pitot nozzle 30 must have an appropriate length L for the fluid intake portion I to be disposed out of the boundary layer of the flow of fluid and preferably in or close to the area of highest velocity of flow of the fluid. The length L may be selected as the cumulative length of the fluid intake portion I and of the tubular portion II of the Pitot nozzle 30, or less. Finally, the pointer 301 is adjusted according to the direction of the flow of fluid, and the Pitot nozzle 30 is locked in position relative to the nozzle holder 40, for example by a lock plate 50 shown in FIG. 1, and if desired, by locking wire, or by other securing means well known in the art. Thereby, the Pitot nozzle 30 will be locked in angular disposition against shocks and vibration and against axial retrieval out of the nozzle holder 40.

In Operation

In operation, incoming fluid flowing in the duct 60 impinges on the fluid intake portion I of the Pitot nozzle 30. Fluid enters the immersed ingestion inlet 35, thus enters the fluid intake portion I, and is arrested by the thereto diametrically opposite obstacle 37 formed by the portion of the nozzle wall 33, or back-wall 36, disposed opposite the ingestion inlet 35, on which the fluid impinges. The obstacle 37 stops the incoming fluid to a zero velocity of fluid, and creates a zone of fluid at stagnation pressure ZSP. As indicated in FIG. 1, the zone of fluid at stagnation pressure ZSP may extend between the obstacle 37 and the dashed line upstream of the obstacle. It is the higher pressure of stagnation of the zone ZPS which pumps the ingested fluid away from the obstacle 37 and into the interior 31 of the Pitot nozzle 30.

The pumped fluid is directed via the interior 31 towards the two diametrically aligned opposite exit openings 38 entered in the nozzle wall 33, which aligned exits 38 are disposed further away from the obstacle 37 along the longitudinal axis Nz of the Pitot nozzle 30. Next, pumped fluid may exit out of one of both exit openings 38. In FIG. 1, fluid flows in the first direction of flow FL, exits out of the uncovered open first exit opening 381 since the second exit opening 382 is blocked, or closed, or covered, by the nozzle holder 40, and is discharged via the fluid discharge outlet 48, to the exterior EXT of the controllable Pitot device 10. In FIG. 2, the Pitot nozzle 30 is shown after pivotal adjustment thereof to ingest fluid flowing in the opposite direction of flow OPPD, which is opposite by 180° to the first direction of flow FL. Hence, fluid from the second direction of flow OPPD will exit out of the now uncovered open second exit opening 382 since the first exit opening 381 is covered close by the nozzle holder 40.

In FIGS. 1 and 2, fluid exiting out of an uncovered open opening 38 is discharged via an unobstructed open fluid discharge outlet 48. Pivotal adjustment in angular disposition of the controllable Pitot device 10 for operation with a first direction of flow of the fluid, or for operation with a second direction of flow of the fluid which is opposite the first direction of flow is simple: It suffices to rotate the Pitot nozzle 30 by 180°, possibly by use of the pointer 301 which is accessible from the exterior EXT of the controllable Pitot device 10.

The operation of the controllable Pitot device 10 is thus the same for a flow of fluid flowing in a first direction of flow FL and for a flow of fluid flowing in a second direction OPPD. Hence, the Pitot nozzle 30 forms a bidirectional Pitot pump by being configured to pump fluid flowing in one of the fluid flowing in the first direction of flow FL and the fluid flowing in the second direction of flow OPPD.

FIGS. 3-6 depict schematic cross-sections taken along the plane A-A of FIG. 1 in which the nozzle holder 40 is stationary relative to the possible angular dispositions of the Pitot nozzle 30 which may be pivoted or turned, or rotated, about the axis Nz. The unobstructed fluid discharge outlet 48 shown in FIGS. 3-6, is aligned downstream of the incoming first direction of flow of fluid FL. Incoming fluid FL is assumed to flow from left to right as shown in FIG. 1, but the fluid ingestion inlet 35 is not shown in FIGS. 3-6. The four successive FIGS. 3-6 illustrate various dispositions of the diametrically opposite first exit opening 381 and second exit opening 382 of the pivotable Pitot nozzle 30. In FIGS. 3-6, each successive Fig. is turned clockwise CW by 90° respective to a previous Fig. to exemplify the capabilities of adjustable control of the Pitot nozzle 30 relative to the direction of flow of the fluid FL. Clockwise CW and counterclockwise CCW directions are depicted in, respectively, FIGS. 18 and 19. The Pitot nozzle 30, which is supported by the nozzle holder 40, is thus pivotable in a clockwise CW direction and in a counterclockwise CCW direction.

Figures 3, 4:
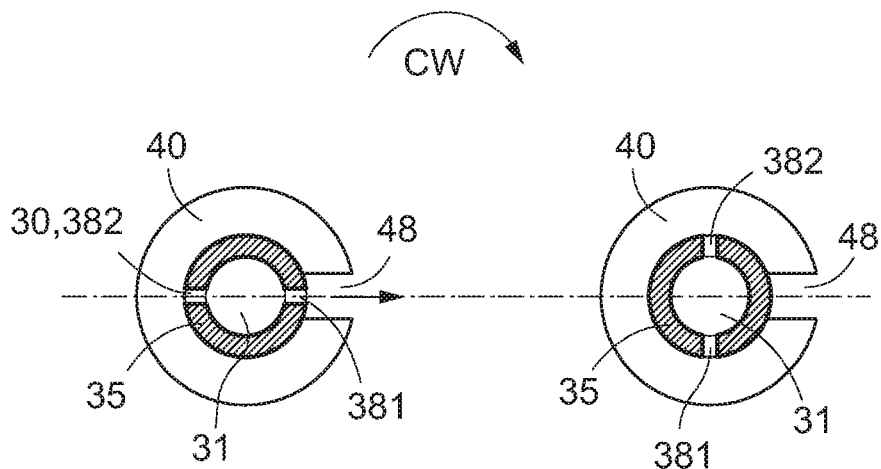
FIGS. 3-7 depict schematic cross-sections taken along the plane A-A of FIG. 1, FIGS. 8-11 illustrate swivel plates and various pointers and lock plates.

FIG. 3 illustrates the direction of the incoming flow of fluid, the Pitot nozzle 30, the nozzle holder 40, the first exit opening 381, and the second exit opening 382. The Pitot nozzle 30 is disposed with the ingestion inlet 35, not shown, facing the incoming flow of fluid while FL. The second exit opening 382 is covered by the nozzle holder 40, wherein covered means impassable to fluid flow, or blocked, or closed for the passage of fluid, thus preventing fluid communication. However, the first exit opening 381 is open, thus uncovered, and is disposed in fluid communication in alignment with the fluid discharge outlet 48. In such an angular disposition, fluid may be pumped. Covered and uncovered dispositions of the two diametrically aligned exit openings 38 is reversible by rotation of the Pitot nozzle 30 relative to the nozzle holder 40. Fluid incoming into the ingestion inlet 35, passes via the interior 31 of the Pitot nozzle 10, then out of the first uncovered open exit opening 381, and exits to the exterior EXT through the fluid discharge outlet 48.

Figures 5, 6:
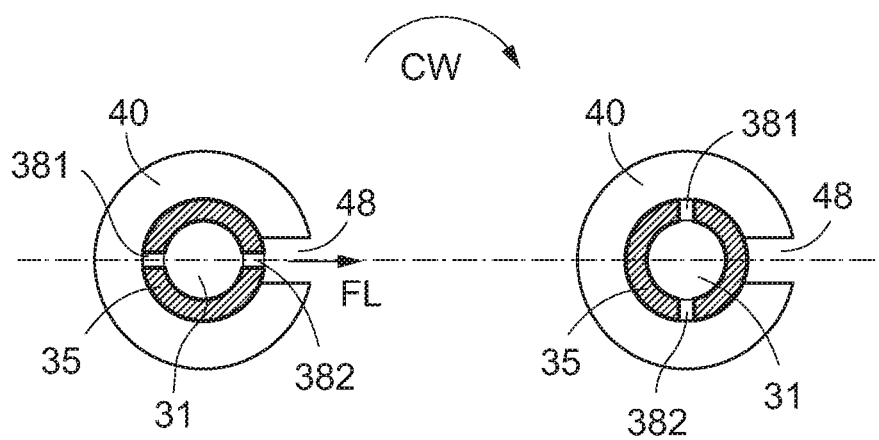

In FIG. 4, the Pitot nozzle 30 has been turned clockwise CW by 90° relative to FIG. 3: both the first exit opening 381 and the second exit opening 382 are covered by the nozzle holder 40, hence fluid is prevented from being discharged out of the fluid discharge outlet 48. In such an angular disposition, the fluid pumping operation of the controllable Pitot device 10 is stopped, but reversibly so. In FIG. 5, the Pitot nozzle 30 has been turned clockwise CW by 180° relative to FIG. 3: ingested and pumped fluid may exit out of the unobstructed open discharge outlet 48 since both the uncovered second exit opening 382 and the fluid discharge outlet 48 are aligned in fluid communication. In FIG. 6, the Pitot nozzle 30 has been turned clockwise CW by 270° relative to FIG. 3: both the first exit opening 381 and the second exit opening 382 are covered close by the nozzle holder 40. Therefore, fluid cannot be discharged out of the fluid discharge outlet 48 and the pumping operation of the controllable Pitot device 10 is reversibly stopped.

FIGS. 3-6 thus illustrate dispositions of the Pitot nozzle 30 which may be adjusted to allow pumping of fluid, and dispositions wherein the pumping of fluid is intentionally prevented. Evidently, the Pitot nozzle 30 may be further turned clockwise CW and the same sequence described with respect to FIGS. 3-6 may be repeated. Instead of turning the Pitot nozzle 30 clockwise CW, the same results will be achieved and the same process will be performed by turning the Pitot nozzle 30 counterclockwise CCW. It is noted that the description related to FIGS. 3-6 is also valid for a fluid ingestion inlet 35 pivoted by 180° for a flow of fluid flowing in the opposite direction OPPD, thus from right to left as shown in FIG. 2. It is noted that the angular disposition of the two exit openings 38 relative to the angular disposition of the flow-facing fluid ingestion inlet 35 is irrelevant to the pumping capability of the controllable Pitot device 10, assuming that the unobstructed fluid discharge outlet 48 is appropriately oriented in fluid communication with the uncovered exit openings 38.

It may thus be said that the Pitot nozzle 30 supports two aligned diametrically opposed open fluid exit openings 38, and is pivotably rotatable and adjustable in selected angular dispositions. Hence, there is at least one angular disposition in which an open exit opening 381 is uncovered for free passage therethrough of fluid. Similarly, there is at least another one open angular disposition in which an open exit opening 382 is covered close to prevent passage of fluid therethrough. From an uncovered open exit opening 382, fluid is ejected to the exterior EXT via an unobstructed fluid discharge outlet 48. Thereby, the Pitot nozzle 30 may pump fluid by adjustment thereof in an angular disposition which establishes fluid communication between the fluid ingestion inlet 35, the uncovered opening EXO, and an unobstructed fluid discharge outlet 48. It is noted that the angular disposition of the uncovered open exit opening 38 is dependent from the angular disposition of the unobstructed fluid discharge outlet 48.

Figure 7:
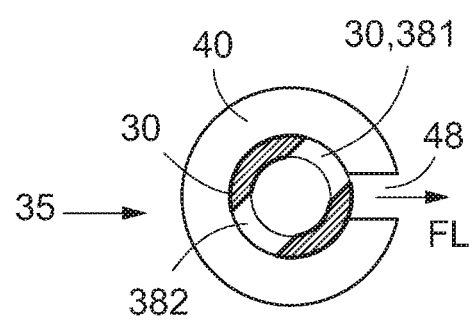

FIG. 7 refers to the ability to use the controllable Pitot device 10 for the control of the flow rate of discharge of fluid which is pumped thereout. Like FIGS. 3-6, FIG. 7 depicts a cross-section taken along the plane A-A of FIG. 1. It is assumed that the direction of flow of the fluid FL, from left to right shown in FIG. 7, is the same as that shown in FIG. 1. An exemplary angular disposition of the fluid ingestion inlet 35 is shown by dashed lines.

FIG. 7 illustrates the angular disposition of the Pitot nozzle 30 which may be used to control the flow rate of discharge of fluid which is pumped out by the controllable Pitot device 10. To this end, the relative mutual size of the exit openings 38 and of the discharge outlet(s) 48 may be selected according to the desired characteristics of flow rate of ingestion, or of discharge of fluid. FIG. 7 depicts an exemplary pivoted angular disposition of the Pitot nozzle 30 relative to the nozzle holder 40 showing a certain degree of overlap between the exit opening 381 and the fluid discharge outlet 48. In such a pivoted angular disposition, fluid is discharged out of the controlled Pitot device 10 at a certain flow rate relative to the mutual degree of alignment, or of fluid communication, of the exit opening 381 and of the fluid discharge outlet 48. Various different radial angular dispositions of the Pitot nozzle 30 will decrease or increase the discharge of fluid which may vary from zero fluid discharge flow, as shown in FIGS. 4 and 6, to a maximum fluid discharge flow as shown in FIGS. 3 and 5, as occurs at aligned overlap of the related uncovered exit opening 381 or 382, and the unobstructed fluid discharge outlet 48. The Pitot nozzle 30 is thus pivotally adjustable to control a rate of fluid discharge flow of the ingested fluid, which rate of discharge may span from a zero rate of fluid discharge flow to a maximal fluid discharge flow rate.

The controllable Pitot device 10 thus allows to adjust the angular disposition of the Pitot nozzle 30 to control the volumetric flow rates of pumped fluid. Such rates may extend from a maximal volumetric flow rate to a minimal volumetric flow rate which is nil. Evidently, the maximal volumetric flow rate is obtained when both an uncovered free opening 38 and an unobstructed fluid discharge outlet 48 are aligned in the same angular disposition, and in fluid communication. The angular disposition of the Pitot nozzle 30 thus controls the operation of the controllable Pitot device 10.

Locking the Pitot Nozzle

A lock plate 50 is a device used to prevent retrieval of the Pitot nozzle 30 out of the nozzle holder 40 and to reversibly lock the Pitot nozzle 30 in selected angular disposition, despite shocks and vibrations. The lock plate 50 may be fixedly coupled to the nozzle holder 40, i.e. the support structure 44 or the embedded support 45. Mechanical fasteners 54 fixing the lock plate 50 to the nozzle holder 40 may be unfastened to change the angular disposition of the Pitot nozzle 30. If desired, the mechanical fasteners 54 may be secured by safety wire or other means.

Figure 8:
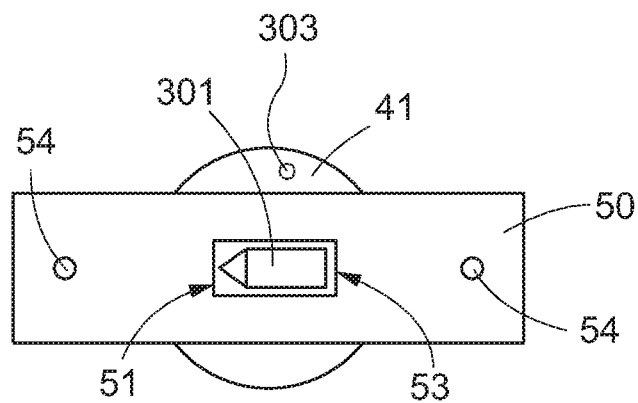
Figure 9:
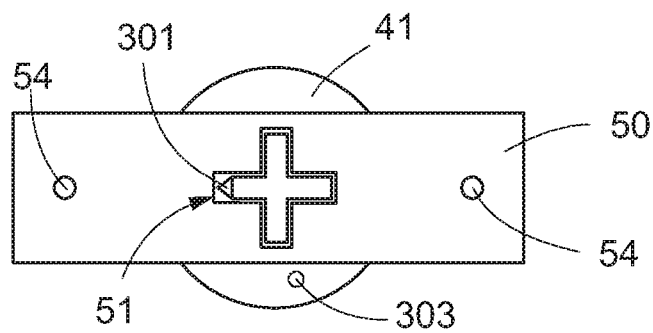
Figure 10:
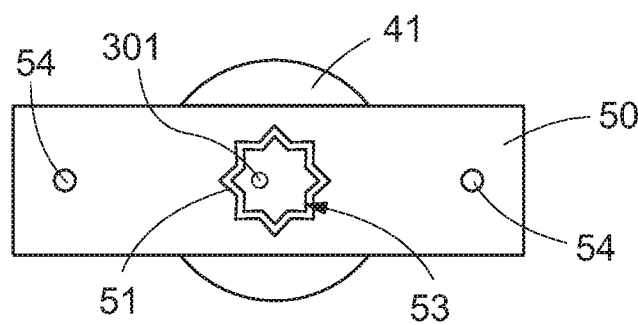
Figure 24:
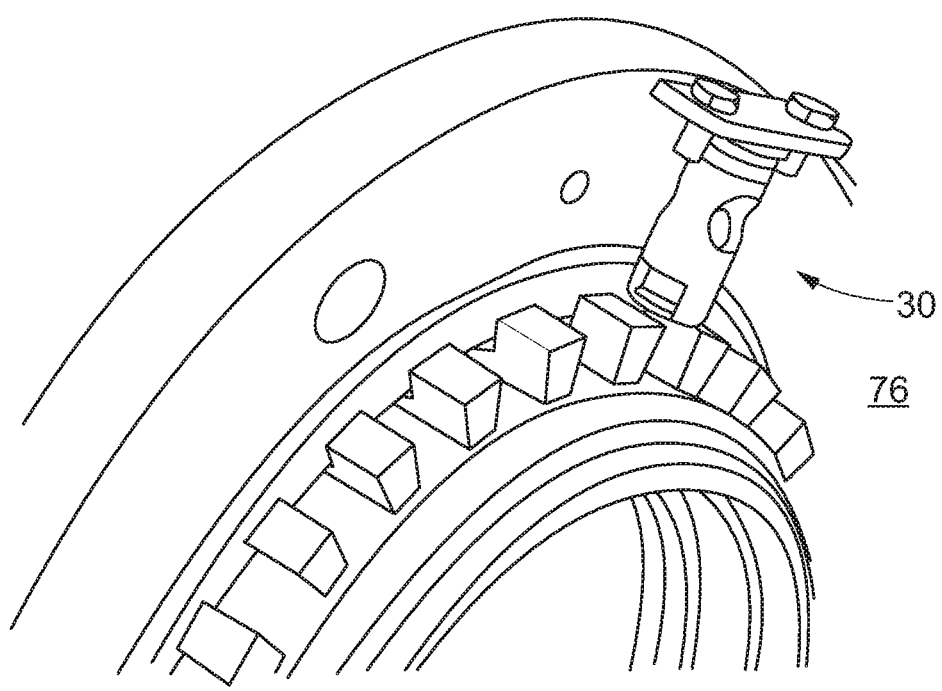
FIG. 24 shows a controllable Pitot device in the seal chamber of a rotating fluid machine.

FIGS. 8-11 illustrates a top elevation of the pointer 301 mounted on the swivel plate 41, both of which pertain to the third solid portion III of the Pitot nozzle 30, and are accessible from the exterior EXT of the controllable Pitot device 10. The lock plate 50 as attached to the nozzle holder 40 into which the Pitot nozzle 30 is properly seated, is depicted in FIGS. 1, 20, and 24. The pointer 301 which is manually or otherwise pivotable, may be configured to indicate the orientation of the immersed fluid ingestion intake 35, and a mark 303, disposed on the swivel plate 41, may indicate the angular orientation of the two aligned open exit openings 38. In FIGS. 8-10 the pointer 301 may protrude out of the surface of the swivel plate 41 and in FIG. 11, the pointer 301 is formed as a slot 51 wherein a tongue 52 of the lock plate 50 is bent into the slot 51 and the mark 303 may be disposed on the swivel plate 41.

A lock plate 50 may thus be provided to conform to the shape of the pointer 301 to lock the Pitot nozzle 30 in discrete angular dispositions. A lock plate 50 of generally rectangular or other desired shape, may have a slot 51, or a tongue 52, or a pointer-conforming shape 53 which is configured to conform to the type of pointer 301 supported by the swivel plate 41. The lock plate 50 may be mounted over the swivel plate 41 and secured for example to the nozzle holder 40 by mechanical fasteners 54 to lock the Pitot nozzle 30 in discrete angular depositions, and to prevent retrieval thereof out of the nozzle holder 40. A mark 303 disposed on the swivel plate 41 may indicate the direction of an exit opening 38.

In FIG. 8, the lock plate 50 is fixedly retained to the nozzle holder 40, as shown in FIGS. 1, 20, and 24. A longitudinal slot 51 is opened in the lock plate 50 to fixedly retain the protruding pointer 301, and thus the Pitot nozzle 30, in one out of the two possible angular dispositions. A mark 303 may indicate the direction of orientation of one of the two aligned open exit openings 38.

In FIG. 9, the cross-like slot 51 of the lock plate 50 is configured to permit to lock the protruding pointer 301 in for example, four discrete radial angular dispositions, i.e. two pumping dispositions and two pumping preventing dispositions for example. The arrowhead shape marked 303 indicates the direction of the fluid ingestion inlet 35.

FIG. 10 depicts a star-like protruding pointer 301 lockable in a plurality of various angular orientations by use of a thereto conforming lock plate 50 having a pointer-conforming shape 53 configured as a star-like opening. A circular protruding or recessed shape on the pointer 301 may indicate the direction of the fluid ingestion inlet 35.

Figure 11:
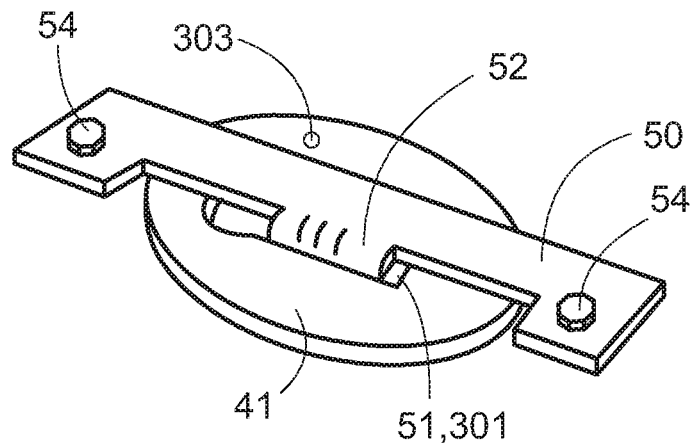

FIG. 11 illustrates a swivel plate 41 having a lock-plate 50 with a tongue 52 which is bent into in the longitudinal slot 51. The slot 51 is also the pointer 301. The lock-plate 50 for securing the Pitot nozzle 30 in place may thus have a tongue 52, which is bent out of the plane of the lock plate 50, to be inserted into the longitudinal slot 51 to prevent pivotal rotation of the Pitot nozzle 30. The angular direction indicated by the slot 51 may be clearly seen and may even be detectable by touch for ease of checking of the adjustment of the Pitot nozzle 30. The swivel plate 41 may carry a mark 303 pointing to the angular orientation of one of the two aligned open exit openings 38, such as a notch or a painted sign for example.

Control of Fluid Discharge Angular Orientation

The angular orientation of the stationary fluid discharge outlet 48 which is supported for example by the support structure 44, is controllable and may be selected as desired. In other words, the radial angular orientation of the two aligned fluid exit openings 38 and the radial angular orientation of the fluid ingestion inlet 35 may be may be mutually adapted to accommodate a desired radial angular orientation of the one fluid discharge outlet 48. Such a feature may be advantageous during installation in, or when changes are made to the existing layout of an industrial operation floor. The nozzle holder 40 may be produced with one unobstructed fluid discharge outlet 48 which is directed in a selected angular orientation or may be produced with a plurality of fluid discharge outlets 48. The latter permits to select out of the plurality of discharge outlets, the one fluid discharge outlet 48 to remain open, or unobstructed and operative while the remaining fluid discharge outlets 48 may be reversibly plugged, or obstructed, or otherwise hermetically sealed. Evidently, the selected radial angular orientation of a specific fluid discharge outlet 48 requires a thereto appropriately adapted Pitot nozzle 30 having an appropriate relative angular orientation of the two aligned open exit openings 38 and of the ingestion inlet 35. In other words, the Pitot nozzle 30 may be configured to comply with a selected angular orientation of the fluid discharge outlet 48.

Figure 12:
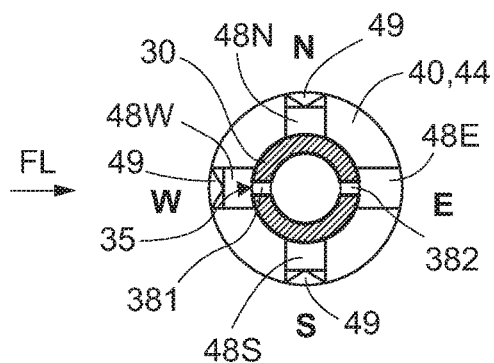
FIGS. 12-15 show cross-sections of a controllable Pitot device having a plurality of fluid discharge outlets.

FIG. 12 depicts a modified rendition of the cross-section shown in FIG. 3 to illustrate another exemplary embodiment of the controllable Pitot device 10. In contrast to FIG. 3, in FIG. 12 the nozzle holder 40 is shown to support a distribution of a plurality of fluid discharge outlets 48, for example four fluid discharge outlets, mutually separated apart in radial angular orientation. The distribution of four fluid discharge outlets 48 has been selected for the sake of ease of illustration, but less or more discharge outlets 48 may be chosen. The four fluid discharge outlets 48 may point to the North, the East, the South and the West and are marked respectively as 48N, 48E, 48S, and 48W. In FIG. 12, three out of the four fluid discharge outlets 48, for example 48N, 48S, and 48W, are obstructed, possibly reversibly so, or hermetically sealed by a plug 49 for example, to obstruct the passage of fluid. Practically, the result is equivalent to that obtained with the configuration of the controllable Pitot device 10 also shown in FIG. 1. The remaining selected open fluid discharge outlet 48E is unobstructed and open for operation in alignment with the two exit openings 38. The ability to select a desired angular orientation for a conduit carrying fluid ejected out of a discharge outlet 48 is advantageous in industry and allows flexibility of installation in an operational factory environment. One may consider that a conduit for carrying ejected fluid to the exterior EXT may need to be oriented into a specific angular direction either to facilitate support thereof and/or to facilitate passage thereof through a cramped environment.

In FIG. 12, the flow of fluid FL incoming from the West W enters the to the West W oriented fluid ingestion inlet 35. Each one out of the three fluid discharge outlets 48 oriented to the North N, the South S, and the West W, is obstructed in hermetical sealing by a plug 49 to obstruct the passage of fluid. The two diametrically opposite exit openings 38 open in the Pitot nozzle 30 are aligned in a West W to East E orientation with the unobstructed fluid discharge outlet open to the East 48E. Ingested fluid thus enters from the West W via the fluid ingestion inlet 35, is pumped to the uncovered second exit opening 382 and is ejected therefrom to the East E via the unobstructed open fluid discharge outlet 48E, as shown in FIG. 12.

Figure 13:
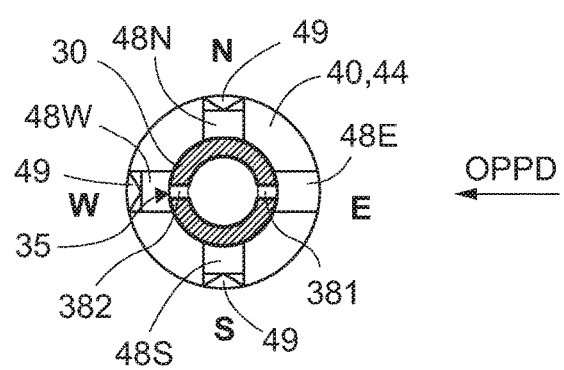

In FIG. 13, the Pitot nozzle 30 has been rotated by 180° relative to the nozzle holder 40 of FIG. 12. The fluid ingestion inlet 35 is now oriented to the East E to operate with fluid flowing from East E to West W, opposite the first direction of flow FL shown in FIG. 12. Fluid flowing in the opposite direction of flow OPPD thus enters the ingestion inlet 35 from the East E. Each one out of the three fluid discharge outlets 48 oriented to the North N, the South S, and the West W, is obstructed in hermetical sealing by a plug 49 to block the passage of fluid. The unobstructed discharge outlet to the East 48E is open and the two diametrically opposite exit openings 38 open in the Pitot nozzle 30 are aligned therewith in an East E to West W orientation. Ingested fluid enters the ingestion inlet 35 from the East E, is pumped to the first uncovered exit opening 381 and is ejected thereout to the East E via the unobstructed discharge opening 48E.

It is noted that although not shown in the Figs., ingested fluid may also be discharged to the West W. For both examples related to FIGS. 12 and 13, to discharge fluid to the West W via the discharge opening 48W, it suffices to remove the hermetically sealing obstructing plug 49 out of the discharge opening 48W and use the same or another plug 49 to obstruct the opening 48E.

Figure 14:
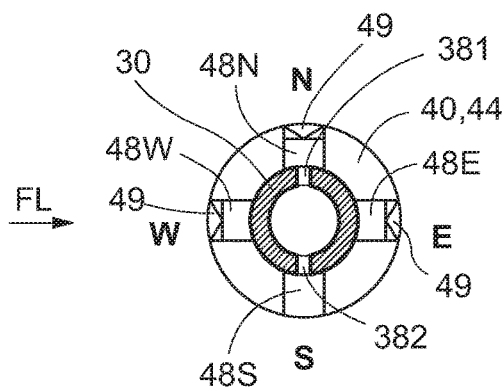

In FIG. 14, the Pitot nozzle 30 has been rotated by 90° relative to the nozzle holder 40 of FIG. 12. The fluid ingestion inlet 35 is oriented to the West W to operate with the flow of fluid flowing in the first direction of flow FL, from West W to East E. Fluid thus enters the ingestion inlet 35 from the West W in the first direction of flow FL. Each one out of the three fluid discharge outlets 48 oriented to the West W, the North N, and the East E, is hermetically sealed obstructed by a plug 49 to block the passage of fluid. The unobstructed discharge outlet to the South 48S is open and the two diametrically opposite open exit openings 38 are uncovered and are aligned therewith in a North N to South S orientation. Ingested fluid thus enters from the West W, is pumped to the uncovered second exit opening 382 and is ejected thereout via the unobstructed discharge opening 48S.

Figure 15:
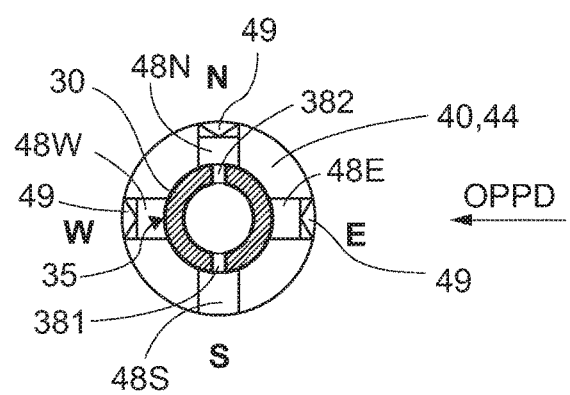

In FIG. 15, the Pitot nozzle 30 has been rotated by 180° relative to the direction of flow of the flow FL shown in FIG. 14. The fluid ingestion inlet 35 is oriented to the East E and fluid flowing in the opposite direction of flow OPPD thus enters the fluid ingestion inlet 35 from the East E. Each one out of the three fluid discharge outlets 48 oriented to the West W, North N, and the East E, is hermetically sealed obstructed by a plug 49 to block the passage of fluid. The discharge outlet 48 to the South 48S is unobstructed open, and the two diametrically opposite exit openings 38 open in the Pitot nozzle 30 are aligned therewith in a North N to South S orientation. Ingested fluid thus enters from the East E, is pumped to the first exit opening 381, and is ejected thereout via the unobstructed discharge outlet 48S.

It is noted that although not shown in the Figs., ingested fluid may also be discharged to the North N. For both examples related to FIGS. 14 and 15, to discharge fluid to the North N via the discharge opening 48N, it suffices to remove the hermetically sealing obstructing plug 49 out of the discharge opening 48N and use the same or another plug 49 to obstruct the opening 48S.

It may thus be said that the Pitot nozzle 30 supports two aligned diametrically opposed open fluid exit openings 38, and is pivotably rotatable in selected angular dispositions. Hence, there is at least one angular disposition in which an open exit opening 38 is uncovered for free passage therethrough of fluid. Similarly, there is at least one angular disposition in which an open exit opening 38 is covered close to prevent passage of fluid therethrough. From an uncovered open exit opening 38, fluid is discharged to the exterior EXT via an unobstructed fluid discharge outlet 48 which is supported by the nozzle holder 40. Thereby, the Pitot nozzle 30 may pump fluid by adjustment thereof in an angular disposition which establishes fluid communication between the fluid ingestion inlet 35, an uncovered opening 38, and an unobstructed fluid discharge outlet 48.

Since the angular disposition of the aligned fluid exit openings 38 may be the same or be different from the angular disposition of the fluid ingestion inlet 35, it may be said that the angular disposition of the aligned fluid exit openings 38 is independent from the angular disposition of the fluid ingestion inlet 35. For pumping fluid, this call for an appropriate configuration of the Pitot nozzle 30, for which must care for fluid communication from the fluid ingestion inlet 35, via an uncovered open fluid exit opening 38, to an unobstructed fluid discharge outlet 48.

FIGS. 12-15 showed that the nozzle holder 40 may support a distribution of a plurality of fluid discharge outlets 48, which distribution has reversibly and hermetically obstructed fluid discharge outlets 48, but for one discharge outlet 48 which is a reversibly unobstructed fluid discharge outlet 48. Obviously, for pumping fluid, the angular disposition of the fluid ingestion inlet 35 independent from the angular disposition of the two aligned open fluid discharge openings 38 which have to provide fluid communication with an unobstructed fluid discharge outlet 48.

With the examples illustrated in relation to FIGS. 12-15, the selection of an angular orientation of the fluid discharge outlet 48 may be easily performed. First, the chosen fluid discharge outlet 48 with the selected radial angular orientation is unplugged to become unobstructed, and the remaining fluid discharge outlet(s) is/are plugged obstructed. Next, securing wire and the lock plate 50 are removed. Then, the Pitot nozzle 30 may be pivoted and the lock plate 50 is fixed over the Pitot nozzle 30 and may be secured. Else, the Pitot nozzle 30 may be pulled out of the nozzle holder 40, or support structure 44, or embedded support 45, and be replaced by a Pitot nozzle having exit openings 38 matching the radial orientation of the selected unobstructed fluid discharge outlet 48. Finally, the lock plate 50 is fixed over the Pitot nozzle 30 and may be secured.

It is thus understood that the nozzle holder 40 has to support an unobstructed fluid discharge outlet 48 having an angular disposition which is independent from the angular disposition of the ingestion inlet 35. Evidently, to pump fluid, the Pitot nozzle 30 has to be configured to allow fluid communication from the ingestion inlet 35, via one uncovered open exit opening 38, and out of the unobstructed fluid discharge outlet 48.

The controllable Pitot device 10 may be configured to discharge fluid in one or in more different radial orientations, and not necessarily disposed in symmetrical radial distribution. The controllable Pitot device 10 is thus controllable in the sense that the radial orientation of the direction of discharge of fluid thereout may be selected as desired.

Figure 16:
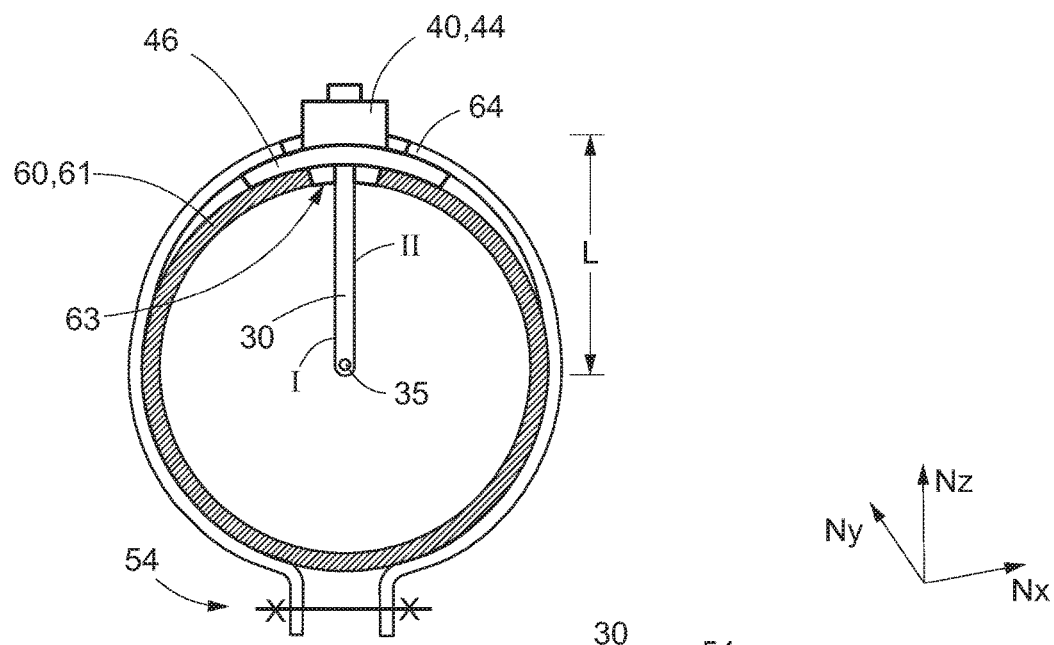
FIG. 16 illustrates an exemplary embodiment for coupling a controllable Pitot device to a duct, FIGS. 17-21 refer to an exemplary embodiment of a controllable Pitot device operative with a rotating fluid machine.

FIG. 16 illustrates an exemplary manner of coupling a controllable Pitot device 10 to a duct 60. For example, at least one strap band 64 may be used to clamp the base 46 of the of support structure 44 to the duct 60 around which the strap band(s) 64 may be stretched by one or more mechanical fastener 54, such as (a) bolt(s) and nut(s) assembly. The Pitot nozzle 30 preferably has an appropriate length L for the fluid intake portion I to be disposed out of boundary layers of the fluid and preferably in or close to the area of highest velocity of flow of the fluid. The length L is adaptable to the dimensions of the duct 60 out of which fluid is pumped.

Pitot Nozzle Embedded Support

An exemplary embodiment of a nozzle holder 40 configured as an embedded Pitot nozzle support 45 for use with a rotating fluid machine 20 is illustrated in FIGS. 17-21.

Figure 17:
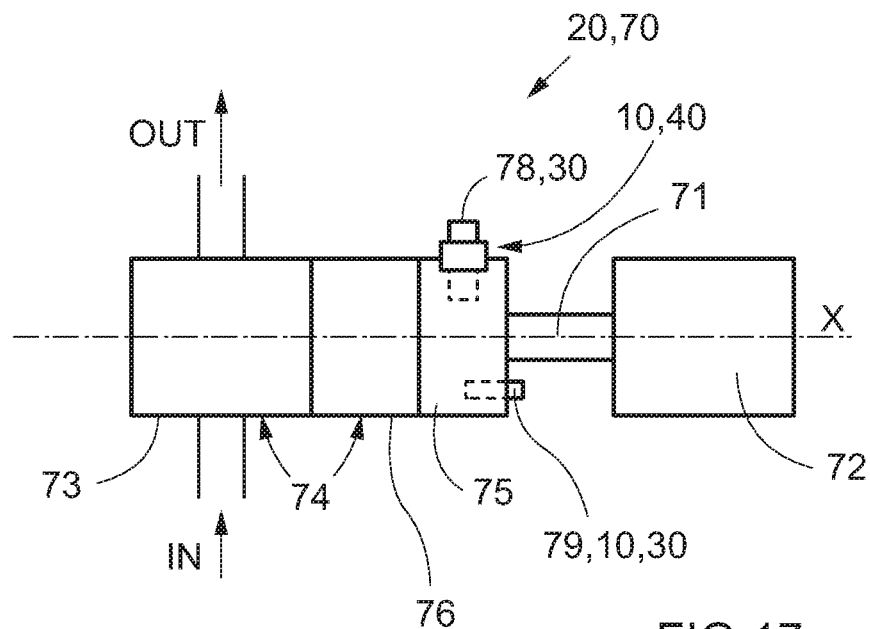
Figure 18:
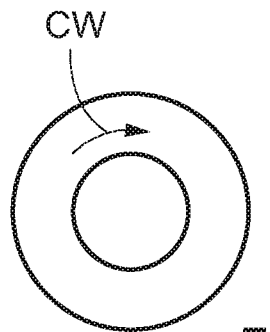

FIG. 17 is a schematic representation of an exemplary rotating fluid machine 20 shown as a pump 70 for example. Fluid enters the pump 70 via a pump intake IN, and exit thereout through a pump outlet OUT. The pump 70 has a shaft 71 driven by a motor 72 rotating an impeller 73, and is enclosed by pump walls 74. An endplate 75 closes a seal chamber 76. In FIG. 17 the shaft 71 is collinear with an axis X. The rotating fluid machine 20 may rotate fluid in a clockwise CW direction as shown in FIG. 18, or in a counterclockwise CCW direction of flow shown in FIG. 19. For example, the Pitot nozzle 30 may be embedded in the endplate 75 of the seal chamber 76, in a radial disposition 78 which is radial relative to the axis X or in a parallel disposition 79 which is parallel relative to the axis X. In both dispositions shown in FIG. 17, the fluid ingestion inlet 35 is immersed in the flow of fluid. The Pitot nozzle holder 40 formed as a support structure 44 may become superfluous when an embedded support 45 is practical. The nozzle holder 40 may thus be configured either as a support structure 44 or as an embedded support 45. The support structure 44 may be coupled to and through the wall 61 of a duct 60 or on a seal chamber housing wall 23 for example, noting that the seal chamber 76 is also a duct 60. The embedded support 45 may be embedded in a wall, say a pump wall 74, or a wall of a duct 61, or an endplate 75 of the seal chamber 76, or where practical. An endplate 75 wherein the Pitot nozzle 30 is embedded becomes an embedded support 45.

For the sake of ease of illustration, the radial disposition 78 of the Pitot nozzle 30, thus radial to the axis X, is described. The same or a similar configuration for the embedment of the Pitot nozzle 30 in parallel disposition 79, which is parallel relative to the axis X, may be used when practical. Being the same or similar, the parallel disposition 79 of the Pitot nozzle 30 is not described in detail.

FIG. 20 illustrates a partial cross-section of a portion of the endplate 75, shown in FIG. 17, of a rotating fluid machine 20 wherein the Pitot nozzle 30 is embedded and is supported. A portion of the endplate or seal plate 75 is thus formed to become the nozzle holder 40 which is embodied as an embedded support 45. In FIG. 20, the endplate 75 is shown to be cut by a plane extending radially away out of the axis X and passing diametrically through the two exit openings 38 of the Pitot nozzle 30. As depicted, the cut also passes in symmetry through the fluid discharge opening 48 open in the endplate 75. The cross-section of FIG. 20 does not show the immersed fluid ingestion inlet 35, but well the thereto diametrically disposed backwall 36 of the Pitot nozzle 30, which forms the obstacle 37. Pumped fluid exits out of the controllable Pitot device 10 via the fluid discharge outlet 48 as exit flow XFL. The disposition of the Pitot nozzle 30 relative to the seal chamber 76 is seen in the partial cross-section of FIG. 24

To integrate the controllable Pitot device 10 for operation with a rotating fluid machine 20, the endplate 75 of the seal chamber 76 has to be modified to function as an embedded support 45 to pump fluid out of the seal chamber 76. This means that the endplate 75 has to be configured to functionally accommodate and receive the Pitot nozzle 30 therein in pivotal freedom of motion. Therefore, a support bore 42 and an arrest recess 47, as with the nozzle holder 40 of FIG. 1, are both machined in the radial periphery of the endplate 75 to fittingly receive the Pitot nozzle 30. Further, a fluid discharge outlet 48 is machined, parallel the X-axis, to allow fluid communication with the with the exterior EXT of the controllable Pitot device 10, thus out of the rotating fluid machine 20.

Next, although not shown, two screwthreaded blind bores may be machined in the arrest recess 47 to accommodate two matching screwthreaded mechanical fasteners 54, such as bolts for example. As with the support structure 44 illustrated hereinabove and shown in FIG. 1, these mechanical fasteners 54 are intended to retain the lock plate 50 in place and to prevent rotation and/or retrieval of the Pitot nozzle 30 out of the support bore 42.

Once the modification of the endplate 75 is completed, this last one may be assembled to close the seal chamber 76.

The Pitot nozzle 30 has to be fabricated to comply with the desired fluid communication path, to fit in the support bore 42 and to accommodate the orientation of the desired direction of discharge of the fluid pumped out of the fluid outlet 48. Furthermore, at least one O-Ring™ seal 302 has to be mounted in the seal groove 39 of the Pitot nozzle 30. Next, the Pitot nozzle 30 with the at least one seal 302 may be inserted in the support bore 42 until seated on the arrest recess 47. Then, the Pitot nozzle 30 has to be pivotally adjusted in angular disposition for the immersed fluid ingestion inlet 35 to face the direction of the flow of fluid. At this point, the exit openings 38 may be aligned with the fluid discharge outlet 48.

The lock plate 50 may be disposed over the swivel plate 41 to retain the Pitot nozzle 30 and the pointer 301 in place. Two mechanical fasteners 54 may fixedly retain the lock plate 50, and safety wire, or locking-wire, not shown in the Figs., may be threaded through a bore opened in the head of one fastener 54, be twisted and be anchored via a bore opened in the head of the second fastener, and be twisted again.

As shown in FIG. 20, only one uncovered exit opening 38, say the exit opening 382, allows pumped fluid to pass therethrough, whereas the other one exit opening 381 is covered close and blocked. The exit opening 382 is shown to be disposed in alignment with the fluid discharge outlet 48 for the ingested fluid to be discharged to the exterior EXT of the rotating fluid machine 20 through the fluid discharge outlet 48 which is uncovered and open in the endplate 75 of the seal chamber 76.

The means for manufacturing the modification of the endplate 75 to operate as an embedded support 45 and to receive the Pitot nozzle 30 therein in pivotal degree of freedom of motion and in leak free operation are well known to those skilled in the art and therefore, need not to be described.

To adjust the controlled Pitot device 10 shown in FIG. 20 to a flow of fluid flowing in an opposite direction of flow, say counterclockwise CCW, it suffices to turn or pivot the Pitot nozzle 30 by 180° for the fluid ingestion opening 35 to face the counterclockwise incoming flow of fluid CCW. To this end, the lock plate 50 has to be removed, the Pitot nozzle 30 has to be appropriately pivoted, and the lock plate 50 has to be returned and secured in place.

Figure 21:
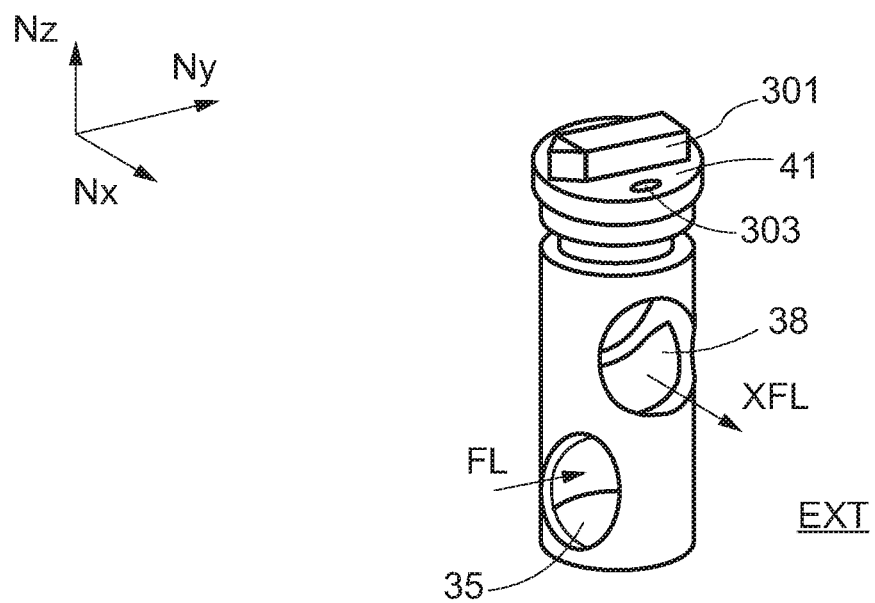

FIG. 21 is an isometric view of the Pitot nozzle 30 shown in cross-section in FIG. 20. The Pitot nozzle 30 may be supplied as a stand-alone product for use with existing equipment. The Pitot nozzle 30 may be used with a nozzle holder 40, selected as a support structure 44, or as an embedded support 45. In FIG. 21 the fluid ingestion inlet 35 is perpendicular to the two aligned exit openings 38. The Pitot nozzle 30 is thus operative to form a controllable Pitot device 10 and pump fluid as an exit flow XFL, to the exterior EXT via a fluid discharge outlet 48.

The Pitot nozzle 30 may be produced from materials compatible with the type of the pumped fluid(s). Such fluids may include liquids and gasses, holding contaminants, and residues that may be corrosive or otherwise aggressive to inappropriately selected materials. Therefore, the Pitot nozzle 30 has to be manufactured out of appropriately selected materials such as metal, plastic material, glass and other known and available materials compatible with the fluid to be pumped.

Methods and processes for producing a Pitot nozzle 30 are well known to those skilled in the art, including for example, material chipping, 3D printing also known as additive machining, casting, etc. Furthermore, the Pitot nozzle 30 may be made from two or more separate machine parts and thereafter be fixedly assembled into one single machine part. For example, the Pitot nozzle 30 may be made without the nozzle bottom closure 32, which closure may be fabricated separately. Then, to form the Pitot nozzle 30, both those machine parts may then be joined together and assembled by means well known for the assembly of materials such as metals, plastic, glass and other known materials.

Once the manufacture of the Pitot nozzle 30 is ended, a seal 302 may be mounted in the seal groove 39 to complete the configuration of the Pitot nozzle 30 which may be introduced via the a priori provided support bore 42, into the modified endplate 75 operative as an embedded support 45.

Remote Control

The controllable Pitot device 10 may further be configured for controlled operation of the Pitot nozzle 30 by remote control, to avoid the need of direct physical access thereto. Such an option may be convenient in case of constriction of equipment, or when noxious products are pumped, or when intermittent operation is required and control commands are provided from a faraway distance requiring extended time of travel to reach the controllable Pitot device 10. Remote control and command of the controllable Pitot device 10 is easily achieved since the Pitot nozzle 30 is angularly adjustable from the exterior EXT of either one of a support structure 44 and as an embedded support 45.

Figure 22:
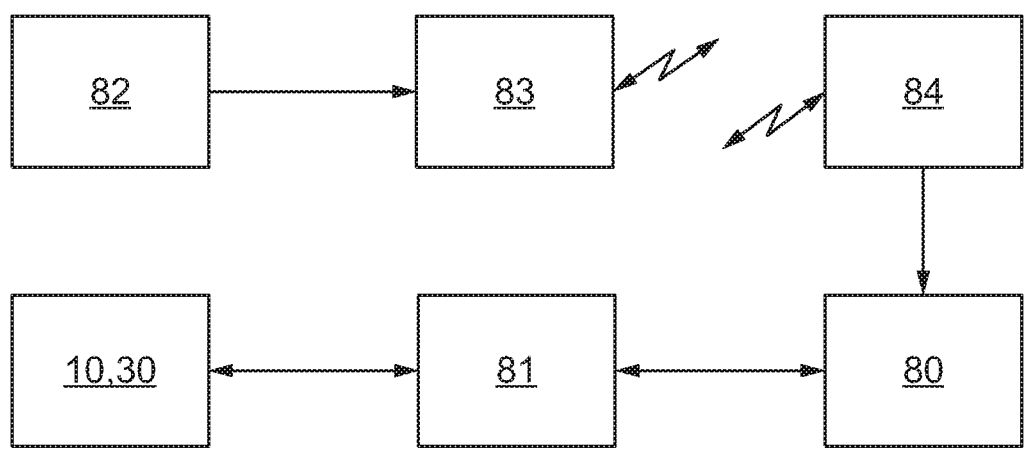
FIG. 22 is a block diagram of an embodiment for remote control of the controllable Pitot device.

FIG. 22 is a block diagram of an exemplary embodiment for command from distance away of the controllable Pitot device 10 by remote control. A power drive unit 80 may be coupled to the controllable Pitot device 10 for pivoting or rotating the Pitot nozzle 30. The power drive unit 80 may be selected as for example, a stepper motor, a solenoid-driven mechanism, a hydraulic device, and a pneumatic device.

Simple motion transfer elements, mechanisms, and transmissions for coupling the power drive 80 to, for example, the pointer 301 of the Pitot nozzle 30, say via a coupling drive 81, are available and well known to those skilled in the art and need not to be described. Commands for controlled pivotal motion of the Pitot nozzle 30 may be emitted from a command station 82 via a thereto coupled first transceiver 83, which communicates with a second transceiver 84 that is coupled to a controller of the power drive 80. Communication between the command station 82, the first and the second transceivers, respectively 83 and 84, and the power drive 80 may be bidirectional to return feedback of the actual angular disposition of the Pitot nozzle 30 to the command station 83. To this end the controllable Pitot device 10 may support an angle measuring device of appropriate type, well known to those skilled in the art. The double headed arrows in FIG. 22 indicate that the actually measured angle of rotation of the Pitot nozzle 30 may be returned as feedback signals from the controllable Pitot device 10 to the command station 82. The first transceiver 83 may be configured as a smartphone, a tablet or a laptop for example.

Use in Industry

The use in industry of controllable Pitot devices 10 for rotating fluid machines 20 making use of mechanical seals is described hereinbelow.

It is well known that rotating fluid machines 20 take advantage of mechanical seals, or rotary mechanical seals, to prevent seeping escape thereout of the rotated fluid. To this end, the rotating shaft 71 of the rotating fluid machines 20 is supported by such mechanical seals which are disposed in the seal chamber 76. Mechanical seals are well known to those skilled in the art, but are not shown in the Figs. Mechanical seals prevent the escape of fluid out of the seal chamber 76. However, when contaminated fluid is pumped, contaminants penetrate into the seal chamber 76. Those solid contaminants may include abrasive particles, such as sand for example, and may cause rapid deterioration of the mechanical seals. Hence, a controllable Pitot device 10 for pumping fluid and solid contaminants out of a seal chamber 76 wherein fluid may flow in a direction according to the direction of rotation of a rotating fluid machine 20, may be advantageous to lengthen the service life of those mechanical seals.

In operation, friction between the rotating shaft 71 and the mechanical seal(s) generates heat that in turn, heats the mechanical seal(s) and shortens their operational service-life span. Therefore, pumping means are in use for such applications for cooling the fluid in the seal chamber 76 and thereby cool the mechanical seals to lengthen their service life. Alternatively, for specific purposes, the fluid flushing the seal chamber 76 may be heated. Existing pumping devices for pumping fluid out of seal chambers of rotating fluid machines 20 are not as efficient as the superior pumping efficacy of the Pitot nozzle 30. As a further advantage, the Pitot nozzle 30 is pivotable, and may thus be used with rotating fluid machine 20 rotating in clockwise CW and in counterclockwise CCW direction. Finally, the Pitot nozzle 30 is controllable, and is accessible from the exterior EXT of the pump 70.

Figure 19:
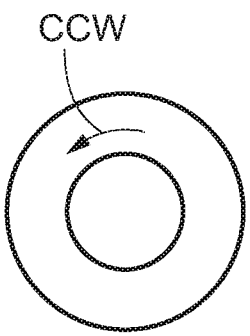
Figure 23:
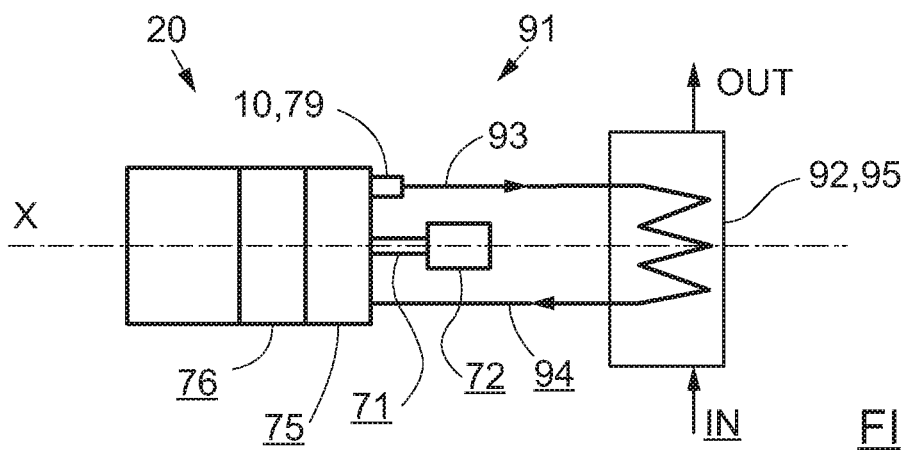
FIG. 23 illustrates an embodiment of a controllable Pitot device pumping discharged fluid through a closed-loop duct circuit.

FIG. 23 depicts a rotating fluid machine 20 shown for example as a pump 70, which may rotate in a clockwise CW direction of flow as shown in FIG. 18, or in a counterclockwise CCW direction of flow shown in FIG. 19. The pump 70 has an axis X aligned with the shaft 71 which is driven by a motor 72 rotating an impeller 73, and has a seal chamber 76 including seal chamber housing walls 23 closed by an endplate 75. As shown in FIG. 17, the controllable Pitot device 10 may be coupled in fluid communication with fluid in the seal chamber 76 via the endplate 75 or the seal chamber housing walls 77. The Pitot nozzle 30 may be disposed in radial or perpendicular to the axis X of the shaft 71.

The controllable Pitot device 10 may be coupled to the seal chamber 76 by use of a nozzle holder 40 which holds the fluid ingestion inlet 35 appropriately immersed in the fluid flowing in the seal chamber 76. Hence, the nozzle holder 40 may be implemented as desired or practical, as a support structure 44 or as an embedded structure 45.

FIG. 23 shows a closed-loop duct 91 that is coupled to a controllable Pitot device 10 embedded in the endplate 75, to pump circulating fluid out of the seal chamber 76 and for return back therein.

A fluid treatment apparatus 92 disposed across the closed-loop duct 91, may accept fluid pumped by the Pitot nozzle 30 via a first conduit branch 93 of the closed loop duct 91. Collected fluid is treated by passage through the treatment apparatus 92 and is returned into the seal chamber 76 via a second conduit branch 94 of the duct 91. The fluid treatment apparatus 92 may be selected as a heat exchanger 95 configured to cool the fluid in the seal chamber 76, or to heat the fluid.

Cooling may be achieved by air cooling of a heat exchanger 95. Alternatively, as shown in FIG. 23, water cooling may be used to cool the pumped fluid through the heat exchanger 95. For example, the heat exchanger 95 may be cooled by fluid entering therein as shown by the arrow marked inlet IN, and exiting thereout as shown by the arrow marked outlet OUT. Evidently, the same process may be used to heat the fluid flowing in the fluid exchanger 95. Other apparatus for fluid treatment 92 may include filtering devices, devices for injection additives into the seal chamber 76, monitoring devices for analysis of the quality of the fluid flowing and/or exiting out in the seal chamber, and the like.

There have thus been described a method and a system for implementing a controllable Pitot device 10.

The controllable Pitot device 10 may have a nozzle holder 40 which supports an unobstructed fluid discharge outlet 48 having a selected angular disposition, as well as a Pitot nozzle 30 for pumping fluid in compliance with the selected angular disposition of the fluid discharge outlet 48. Further, the Pitot nozzle 30 may support an immersed ingestion inlet 35 which is disposed in fluid communication with an uncovered open fluid exit opening 38, and the unobstructed fluid discharge outlet 48 may be oriented in an angular disposition which is independent from the angular disposition of the ingestion inlet 35. However, for pumping, the Pitot nozzle 30 has to be configured and adjusted in angular disposition to provide fluid communication from the fluid ingestion inlet 35, via the uncovered fluid exit opening 38, to the unobstructed fluid discharge outlet 48.

Moreover, the nozzle holder 40 may support a distribution of fluid discharge outlets 48, including a plurality of reversibly hermetically obstructed fluid discharge outlets 48, one of which out of the plurality is a reversibly unobstructed fluid discharge outlet 48.

The Pitot nozzle 30 thus forms a bidirectional Pitot pump for pumping fluid out a fluid flowing in a first direction of flow FL and a fluid flowing in a second opposite direction of flow OPPD.

By adjustment of angular disposition, the Pitot nozzle 30 may control the volumetric flow rates of pumped fluid, which rates may extend from a maximal volumetric flow rate to a minimal volumetric flow rate which is nil. The maximal volumetric flow rate is obtained with the fluid ingestion inlet 35 fully facing incoming fluid, and with both an uncovered free open exit opening 38 and an unobstructed fluid discharge outlet 48 being adjusted in a same angular disposition and being disposed in complete fluid communication.

The angular disposition of the Pitot nozzle 30 may be adjusted by at least one of manual adjustment, motorized adjustment, and adjustment by remote-control. For adjustment of the Pitot nozzle 30 in angular disposition, a pointer 301 is coupled to and is configured for such angular disposition. The pointer 301 is accessible from an exterior EXT of the controllable Pitot device 10. Ingested fluid is pumped to the exterior EXT for discharge thereof via an unobstructed fluid discharge outlet 48 which is supported by the nozzle holder 40.

The controllable Pitot device may pump fluid flowing in a first direction of flow, and also pump fluid flowing in a first direction of flow and in a second direction of flow, thus to pump fluid flowing either in one direction of flow or in two directions of flow.

To pump fluid, the nozzle holder 40 may be configured as a support structure 44 which is coupled to a duct 60, and may also be configured as an embedded support 45 which is embedded in a wall of the duct 61.

The Pitot nozzle 30 may be adjustable in pivotal rotation in angular dispositions which may be selected as a disposition for pumping fluid, and a disposition wherein the pumping of fluid is prevented. It may be said that it is the angular disposition of the Pitot nozzle 30 which controls the operation of the controllable Pitot device 10. Further, the angular disposition of the Pitot nozzle 30 may be easily adjusted by access to a portion thereof which protrudes out to the exterior EXT of the nozzle holder 40.

The nozzle holder support structure 44 which supports the Pitot nozzle 30 may support either a fluid discharge outlet 48 which is unobstructed for passage of fluid therethrough, or at least one fluid discharge outlet 48 which is hermetically obstructed and sealed close, and in addition, at least one fluid discharge outlet 48 which is unobstructed for passage of fluid therethrough.

The Pitot nozzle 30 may further support two aligned fluid open exit openings 38, the angular disposition of which is independent from the angular disposition of the fluid ingestion inlet 35 on condition that the Pitot nozzle 30 is appropriately configured and is adjusted in angular disposition to provide fluid communication from the ingestion inlet 35, via the open uncovered fluid exit opening 38 to the unobstructed fluid discharge outlet 48.

The angular disposition of the Pitot nozzle 30 may be oriented at least by operation of manual adjustment, motorized adjustment, and adjustment by remote-control.

The embedment of the controllable Pitot device 10 in the rotating fluid machine 20 may be achieved either ab initio while in manufacture, or by retrofit manufacture.

There is also provided a method for implementing a controllable Pitot device 10 wherein the Pitot nozzle 30 is pivotally orientable in angular dispositions which may be selected as an angular adjustment for pumping fluid and an angular adjustment for preventing fluid to be pumped.

It is noted that the same fluid ingestion inlet 35 is operative for both the first and the second opposite direction of flow of fluid, respectively FL and OPPD.

The angular disposition of the ingestion inlet 35 may be the same or be different from the angular disposition of an unobstructed fluid discharge outlet 48.

It may thus be said that for pumping fluid, the angular disposition of the ingestion inlet 35 is independent from the angular disposition of the unobstructed fluid discharge outlet 48 as long as the Pitot nozzle 30 is appropriately configured and is adjusted in angular disposition to provide fluid communication from the fluid ingestion inlet 35, via the uncovered open fluid exit opening 38, to the unobstructed fluid discharge outlet 48. Vice versa, for pumping fluid, the angular disposition of the unobstructed fluid discharge outlet 48 is independent from the angular disposition of the ingestion inlet 35 as long as the Pitot nozzle 30 is appropriately configured and is adjusted in angular disposition to provide fluid communication from the fluid ingestion inlet 35, via a fluid exit opening 38, to the unobstructed fluid discharge outlet 48.

For pumping fluid, the angular disposition an uncovered open exit opening 38 is dependent from the angular disposition of an unobstructed fluid discharge outlet 48. For pumping fluid, this means that fluid communication has to be established between an uncovered open exit opening 38 and an unobstructed fluid discharge outlet 48.

INDUSTRIAL APPLICABILITY

Embodiments of the controllable Pitot device 10 described hereinabove find applications in industries producing fluid rotating machines 20 and industries using those machines, such as the chemical industry amongst others.

List of Reference

| No. | Item | FIGURE |
|---|---|---|
| I | fluid intake or immersed portion of 30 | 1 |
| II | hollow interior/tubular portion of 30 | 1 |
| III | solid portion of 30 | 1 |
| 10 | controllable Pitot device 10 | 1 |
| 20 | rotating fluid machine | 23 |
| 23 | seal chamber housing wall | 23 |
| 30 | Pitot nozzle | 1 |
| 31 | Pitot interior portion II | 1 |
| 32 | nozzle bottom closure | 1 |
| 33 | nozzle wall | 1 |
| 34 | top closure 30 | 1 |
| 35 | fluid ingestion inlet | 1 |
| 36 | backwall | 1 |
| 37 | obstacle | 1 |
| 38 | exit opening | 1 |
| 39 | seal groove | 1 |
| 40 | nozzle holder | 1 |
| 41 | swivel plate | 1 |
| 42 | support bore | 1 |
| 43 | holder head | 1 |
| 44 | support structure | 1 |
| 45 | embedded support | 20 |
| 46 | base of nozzle holder | 1 |
| 47 | arrest surface/recess | 1 |
| 48 | fluid discharge outlet | 1 |
| 48E | East discharge | 12 |
| 48N | North discharge | 12 |
| 48S | South discharge | 12 |
| 48W | West discharge | 12 |
| 49 | Plug | 12 |
| 50 | lock plate | 1 |
| 51 | slot | 8 |
| 52 | tongue | 11 |
| 53 | pointer conforming shape | 8 |
| 54 | mechanical fasteners | 8 |
| 60 | duct of fluid | 1 |
| 61 | wall of the duct | 1 |
| 62 | threaded screw coupling | 1 |
| 63 | aperture in the duct of fluid DCT | 1 |
| 64 | strap band | 16 |
| 65 | duct surface | 1 |
| 70 | pump | 17 |
| 71 | shaft | 17 |
| 72 | motor | 17 |
| 73 | impeller | 17 |
| 74 | pump wall | 17 |
| 75 | endplate of the seal chamber | 17 |
| 76 | seal chamber | 17 |
| 78 | radial disposition | 17 |
| 79 | parallel disposition | 17 |
| 80 | power drive unit | 22 |
| 81 | coupling drive | 22 |
| 82 | command station | 22 |
| 83 | first transceiver | 22 |
| 84 | second transceiver | 22 |
| 91 | closed loop duct | 23 |
| 92 | fluid treatment apparatus | 23 |
| 93 | first conduit branch | 23 |
| 94 | second conduit branch | 23 |
| 95 | heat exchanger | 23 |
| 301 | pointer | 1 |
| 302 | seal | 1 |
| 303 | mark | 8 |
| 304 | recess | 2 |
| 381 | first exit opening | 1 |
| 382 | second exit opening | 1 |
| IN | pump intake | 23 |
| OUT | pump outlet | 23 |
| $\Phi$ | diameter of arrest recess | 1 |
| CCW | counterclockwise | 19 |
| CW | clockwise | 18 |
| D | diameter of swivel plate SWPL | 1 |
| E | East | 12 |
| EXT | exterior of 10 | 1 |
| FL | first direction of flow | 1 |
| IN | intake | 23 |
| L | length | 1 |

-continued

List of Reference

| No. | Item | FIGURE |
|---|---|---|
| N | North | 12 |
| Nz | longitudinal axis | 1 |
| OPPD | opposite direction of flow | 2 |
| OUT | outlet | 23 |
| S | South | 12 |
| W | West | 12 |
| X | shaft axis | 17 |
| XFL | exit flow | 21 |
| ZSP | zone of stagnation pressure | 1 |

The invention claimed is:

1. A controllable Pitot device comprising:
a Pitot nozzle configured to pump fluid out of a flow of fluid, the Pitot nozzle comprising a fluid ingestion inlet and two diametrically opposed open fluid exit openings; and
a nozzle holder comprising an unobstructed fluid discharge outlet, the nozzle holder being configured to support the Pitot nozzle such that the Pitot nozzle is pivotably adjustable to an angular disposition from among a plurality of angular dispositions including a first angular disposition to pump fluid flowing in a first direction of flow, and a second angular disposition to pump fluid flowing in a second direction of flow that is opposite to the first direction of flow,
wherein:
the unobstructed fluid discharge outlet is oriented in an angular disposition which is independent of the angular disposition of the fluid ingestion inlet,
the Pitot nozzle is further configured to pump in accordance with the angular disposition of the unobstructed fluid discharge outlet, and
the Pitot nozzle is pivotable such that the angular disposition thereof is an angular disposition in which (i) one of the open fluid exit openings is an uncovered fluid exit opening for free passage of fluid therethrough, (ii) the other one of the open fluid exit openings is a covered fluid exit opening for preventing passage of fluid therethrough, and (iii) fluid communication is provided from the fluid ingestion inlet to the unobstructed fluid discharge outlet via the uncovered fluid exit opening.

2. The device of claim 1, wherein the Pitot nozzle is pivotable in a clockwise direction and in a counterclockwise direction.

3. The device of claim 1, wherein the angular disposition of the uncovered fluid exit opening is dependent on the angular disposition of the unobstructed fluid discharge outlet.

4. The device of claim 1, wherein the nozzle holder comprises a distribution of fluid discharge outlets, including a plurality of reversibly hermetically obstructed fluid discharge outlets, and one of the plurality of reversibly hermetically obstructed fluid discharge outlets is reversibly the unobstructed fluid discharge outlet.

5. The device of claim 1, wherein the Pitot nozzle forms a bidirectional Pitot pump configured to pump out one of fluid flowing in the first direction of flow and fluid flowing in the second direction of flow.

6. The device of claim 1, wherein:
adjustment of the angular disposition of the Pitot nozzle controls volumetric flow rates of pumped fluid, which rates extend from a maximal volumetric flow rate to a minimal volumetric flow rate which is zero, and
the maximal volumetric flow rate is obtained with the fluid ingestion inlet facing incoming fluid and with both the uncovered fluid exit opening and the unobstructed fluid discharge outlet being in a same angular disposition and in the fluid communication.

7. The device of claim 1, wherein the angular disposition of the Pitot nozzle is adjustable by at least one of manual adjustment, motorized adjustment, and adjustment by remote-control.

8. The device of claim 1, further comprising a pointer coupled to and configured for adjustment of the angular disposition of the Pitot nozzle, the pointer being accessible from an exterior of the controllable Pitot device.

9. The device of claim 8, wherein ingested fluid is pumped to the exterior for discharge thereof via the unobstructed fluid discharge outlet.

10. A controllable Pitot device comprising:
a Pitot nozzle comprising a fluid ingestion inlet; and
a nozzle holder configured to support the Pitot nozzle to be pivotably adjustable to an angular disposition from among a plurality of adjustable angular dispositions including a first angular disposition and a second angular disposition, and to immerse the fluid ingestion inlet of the Pitot nozzle in a flow of fluid flowing within a duct,
wherein:
the Pitot nozzle is configured to pump fluid from one of (i) a flow of fluid flowing in a first direction of flow, by adjustment of the angular position of the Pitot nozzle to the first angular disposition, and (ii) a flow of fluid flowing in a second direction of flow which is opposite the first direction of flow, by adjustment of the angular position of the Pitot nozzle to the second angular disposition which is diametrically opposite from the first angular disposition, and
the nozzle holder is configured as one of a support structure coupled to the duct, and an embedded support embedded in a duct wall of the duct.

11. The device of claim 10, wherein the Pitot nozzle is configured to pump fluid flowing in one of one direction of flow, and two directions of flow.

12. The device of claim 10, wherein the angular disposition of the Pitot nozzle controls operation of the controllable Pitot device.

13. The device of claim 10, wherein the angular disposition of the Pitot nozzle is adjusted by access to a portion thereof which protrudes out of the nozzle holder.

14. The device of claim 10, wherein the nozzle holder comprises one of:
a fluid discharge outlet which is unobstructed for passage of fluid therethrough, and
at least one fluid discharge outlet which is hermetically obstructed and sealed closed, and a fluid discharge outlet which is unobstructed for passage of fluid therethrough.

15. The device of claim 14, wherein to pump fluid, the Pitot nozzle comprises two aligned fluid open exit openings having angular dispositions which are independent from an angular disposition of the fluid ingestion inlet.

16. A controllable Pitot device comprising:
a Pitot nozzle comprising a fluid ingestion inlet; and
a nozzle holder configured to support the Pitot nozzle to be pivotably adjustable to a plurality of adjustable angular dispositions and to immerse the fluid ingestion inlet of the Pitot nozzle in a flow of fluid flowing within a duct, wherein:

the Pitot nozzle is configured to pump fluid from one of (i) a flow of fluid flowing in a first direction of flow, by adjustment of the Pitot nozzle to a first angular disposition, and (ii) a flow of fluid flowing in a second direction of flow which is opposite the first direction of flow, by adjustment of the Pitot nozzle to a second angular disposition which is diametrically opposite from the first angular disposition, and the plurality of angular dispositions to which the Pitot nozzle is pivotably adjustable include a disposition for pumping fluid, and a disposition preventing pumping of fluid.

* * * * *